(12) United States Patent
Li et al.

(10) Patent No.: US 11,512,542 B2
(45) Date of Patent: Nov. 29, 2022

(54) INTELLIGENT THROTTLED WELL-KILLING METHOD AND DEVICE FOR OVERFLOW IN HIGH-TEMPERATURE AND HIGH-PRESSURE DEEP DRILLING

(71) Applicant: SOUTHWEST PETROLEUM UNIVERSITY, Chengdu (CN)

(72) Inventors: Qian Li, Chengdu (CN); Menghan Si, Chengdu (CN); Hu Yin, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 311 days.

(21) Appl. No.: 16/854,915

(22) Filed: Apr. 22, 2020

(65) Prior Publication Data

US 2020/0362650 A1 Nov. 19, 2020

(30) Foreign Application Priority Data

May 15, 2019 (CN) .......................... 201910409370.3

(51) Int. Cl.
| | |
|---|---|
| *E21B 21/08* | (2006.01) |
| *E21B 21/10* | (2006.01) |
| *E21B 47/06* | (2012.01) |
| *E21B 47/10* | (2012.01) |
| *G05D 16/20* | (2006.01) |
| *E21B 44/00* | (2006.01) |
| *E21B 33/06* | (2006.01) |

(52) U.S. Cl.
CPC ............ *E21B 21/08* (2013.01); *E21B 21/106* (2013.01); *E21B 44/00* (2013.01); *E21B 47/06* (2013.01); *E21B 47/10* (2013.01); *G05D 16/2013* (2013.01); *E21B 33/06* (2013.01)

(58) Field of Classification Search
CPC ........ E21B 21/08; E21B 21/106; E21B 44/00; E21B 47/06; E21B 47/10; E21B 33/06; G05D 16/2013
See application file for complete search history.

(56) References Cited

U.S. PATENT DOCUMENTS

| | | | | |
|---|---|---|---|---|
| 3,470,971 A | * | 10/1969 | Dower .................... | E21B 21/08 175/25 |
| 6,484,816 B1 | * | 11/2002 | Koederitz ............... | E21B 21/08 175/48 |
| 9,631,444 B1 | * | 4/2017 | Sun ......................... | E21B 47/06 |
| 10,337,267 B1 | * | 7/2019 | Wang ...................... | E21B 44/00 |
| 10,408,014 B1 | * | 9/2019 | Sun ......................... | E21B 47/06 |
| 2013/0098605 A1 | * | 4/2013 | Dirksen .................. | E21B 21/10 166/305.1 |
| 2020/0277830 A1 | * | 9/2020 | Ross ....................... | E21B 47/18 |

* cited by examiner

*Primary Examiner* — Taras P Bemko
(74) *Attorney, Agent, or Firm* — Bayramoglu Law Offices LLC

(57) ABSTRACT

In view of the problems of complex downhole conditions, low control precision of bottomhole pressure, low one-time success rate of well-killing and the like during a high-temperature and high-pressure deep well-killing operation, a well-killing operation wellbore flowing model is established according to measured data during throttled well-killing. The fluid distribution and flowing states in a wellbore annulus are analyzed in real time, and during a measured standpipe pressure deviation design, a pressure control value is calculated accurately in consideration of the effects of a pressure wave propagation speed and a back pressure application delay, and a throttle valve is automatically adjusted and automatically controlled to actuate.

9 Claims, 2 Drawing Sheets

INTELLIGENT THROTTLED WELL-KILLING METHOD AND DEVICE FOR OVERFLOW IN HIGH-TEMPERATURE AND HIGH-PRESSURE DEEP DRILLING

CROSS REFERENCE TO THE RELATED APPLICATIONS

This application is based upon and claims priority to Chinese Patent Application No. 201910409370.3, filed on May 15, 2019, the entire contents of which are incorporated herein by reference.

TECHNICAL FIELD

The present invention relates to the technical field of pressure control of oil and gas wells, and more particularly, to an intelligent throttled well-killing method and device for overflow in high-temperature and high-pressure deep drilling.

BACKGROUND

Well control, as an important link in the exploration and development of petroleum and natural gas, has always been in a prominent position in safety production. Especially in recent years, oil and gas exploration and development have gradually moved to deep complex formations at high temperatures and pressures. When drilling deep complex formations, due to complex pore pressure changes in deep complex formations and complex wellbore pressure changes caused by easy susceptibility of the drilling fluid density and rheological properties to high temperatures and high pressures, the wellbore pressure is unbalanced and the formation fluid invades the wellbore to cause an overflow After the overflow occurs, if the control treatment is not proper, it will evolve into well surges, blowouts, and even out-of-control blowouts. In severe cases, it may even cause casualties, equipment damage, and environmental pollution.

In order to prevent the overflow from developing in the direction of blowout, or even out-of-control blowout, the most commonly used and safe and effective control method is to perform throttled well-killing, that is, using a blowout preventer to close a wellhead in time to prevent further intrusion of formation fluid. A formation pressure is calculated to adjust the density of the drilling fluid, and then adjust an opening degree of a throttle valve on a throttle manifold to maintain a sufficient wellhead back pressure, thereby discharging intruded fluid from the wellbore. The relationship between the pressures during throttled well-killing construction and its requirements are: standpipe pressure during circulation−pressure drop in a drill string+static fluid column pressure in the drill string=annulus back pressure+static fluid column pressure in the annulus+annulus flow resistance=bottomhole pressure≥(slightly greater) than a formation pore pressure. Therefore, the success of throttled well-killing depends on a control degree on the bottomhole pressure during the well-killing operation, that is, depends on the adjustment accuracy of the throttle valve. If the throttle valve is opened too much, the bottomhole pressure will decrease, and the formation fluid may invade the well. The throttle valve is opened too small, the casing pressure rises, and the bottomhole pressure is too high, which may cause leakage in the formation.

For a long time, the drilling teams in China have the following deficiencies in throttled well-killing operations: (1) throttle valve opening control performed by most of drilling teams is manual control performed by on-site technicians, which depends heavily on operator's personal experiences; (2) in view that fluid in a drill string is single-phase fluid, and the well-killing displacement is generally a fixed value during throttled well-killing, the trend of a standpipe pressure during well-killing can be obtained in the design of well-killing according to a requirement on a constant bottomhole pressure. When a standpipe pressure gauge reading deviates from the designed standpipe pressure trend, it is indicated that the bottomhole pressure fluctuates at this time. It is necessary to control the opening degree of the throttle valve to adjust the wellhead back pressure, such that the bottomhole pressure is kept within the design range. However, since it takes time for pressure waves to propagate, the opening degree of the throttle valve is adjusted according to the change in the standpipe pressure gauge, and there is a lag in pressure transmission (the fluid column pressure transmission speed is about 300 m/s. For example, at a well depth of 6000 m, it is detected that the standpipe pressure gauge reading deviates from the design value at time t. In fact, the bottomhole pressure has deviated from the design value at time t−20. The pressure can be applied to the bottomhole after the throttle valve is adjusted to actuate for 20 s at time t, with a delay of about 40 s. During this 40 s, due to the gas migration and pressure transmission delay, the bottomhole pressure will change more than the original fluctuation). For a well with small depth and less complexity, the overflow can be better controlled by rich operating experiences of field technicians. At present, drilling has moved to high-temperature and high-pressure deep complex formations, and well control operations are difficult. Under the existing technical equipment conditions, it is difficult for most wells to achieve a successful well-killing operation once, which requires repeated killing operations. Repeated well-killing prolongs the operating cycle, increases the operating cost, and even destroys the wellbore integrity and contaminate formations, thereby affecting subsequent production operations.

In view of the above problems existing in field throttled well-killing operations in China, researchers continue to propose improvement measures. In "Automatic Control System for Throttled Well-killing", data such as a standpipe pressure, a casing pressure, and a mud pool increment are acquired in real time to calculate a standpipe pressure control differential pressure, a casing pressure control differential pressure, a valve opening degree of a throttle valve and other parameters. The opening and closing of a hydraulic throttle valve are automatically controlled according to the parameters to adjust the wellhead back pressure. Although this invention proposes a solution for the control of the throttle valve, it does not consider a pressure transmission delay caused by the pressure wave propagation, and has less applicability to the currently developed deep wells and ultra-deep wells. In "A Intelligent Well-killing System", a plurality of sensors is used for real-time monitoring and automatic control of drilling and well-killing processes. The opening of the throttle valve is adjusted according to signal instructions to control a casing pressure. In the stage of well-killing operation, this invention mainly aims to automatically adjust an opening degree of a throttle valve and adjust a wellhead back pressure, without considering a pressure transmission delay caused by pressure wave propagation. In addition, in view of the pressure transmission delay caused by the pressure wave propagation, Liu Huixin, Yuan Zheng, Liu Pu, et al., proposed to use a casing pressure instead of a standpipe pressure as the basis for controlling the opening degree of the throttle valve. The method in this method is to use multiphase fluid mechanics to simulate the well-killing operation during a well-killing design, and obtain a designed well-killing casing pressure curve. During the well-killing operation, the opening degree of the throttle valve is strictly controlled according to the designed casing pressure curve. This method theoretically eliminates the time length of pressure wave propagation in a drill string and reduces the pressure transmission delay. However, at the current stage, multiphase fluid mechanics simulation of the well-killing process has the problems such as difficulty in determining initial values, and large differences between theoretical simulation design and actual minerals, which makes it difficult to apply this method to guide well-killing operations.

SUMMARY

An object of the present invention aims is to overcome the shortcomings of the prior art and provide an intelligent throttled well-killing method and device for overflow in high-temperature and high-pressure deep drilling. An outlet flowmeter, an inlet flowmeter, a standpipe pressure gauge, a casing pressure gauge, and an automatic control throttle valve are installed on a throttled well-killing circulation pipeline. An intelligent throttled well-killing construction operation console is designed. A well-killing operation wellbore flow model is established by using measured data during throttled well-killing to analyze fluid distribution and flow conditions in a wellbore annulus. When the measured standpipe pressure deviates from the design, a pressure control valve is calculated accurately in consideration of the effects of a pressure wave propagation speed and a back pressure delay. The automatic control throttle valve is automatically adjusted to actuate to reduce the effect of pressure wave propagation delay, and improve the bottomhole pressure control accuracy during throttled well-killing operations, thereby facilitating avoiding large fluctuations in downhole pressure, maintaining a steady bottomhole pressure, reducing the occurrence of complex situations during well-killing, and improving a success rate of single well-killing.

The object of the present invention is achieved through the following technical solution.

An intelligent throttled well-killing method for overflow in high-temperature and high-pressure deep drilling, comprising the following steps:

S1. before well-killing starts, solving a formation pressure and a designed standpipe pressure by closing a blowout preventer; calculating a wellbore fluid distribution by using a wellbore flow parameter analysis and correction module; displaying designed standpipe pressure data during well-killing on a designed standpipe pressure curve module in an intelligent throttled well-killing construction operation console; displaying designed casing pressure data on a designed casing pressure curve module in the intelligent throttled well-killing construction operation console; displaying designed well-killing displacement data on a measured/designed outlet and inlet displacement curve module in the intelligent throttled well-killing construction operation console; inspecting whether a switch position of each gate valve is normal, so that the throttle manifold is in a standby condition;

S2. opening a flat gate valve 3# and slowly starting a mud pump; injecting well-killing fluid in a drilling fluid tank into a wellbore through a drill string; adjusting an automatic control throttle valve to make a measured value of a casing pressure gauge equal to a shut-in casing pressure and keep it unchanged until the displacement reaches a designed well-killing displacement, and during this period, updating and correcting the wellbore fluid distribution in real time through the wellbore flow parameter analysis and correction module; and S3. keeping the displacement of the well-killing fluid constant, and injecting the well-killing fluid in the drilling fluid tank into the wellbore through the drill string; gradually discharging overflow above a drill bit from the wellbore through an annulus, and during this period, updating and correcting the wellbore fluid distribution in real time through the wellbore flow parameter analysis and correction module, wherein when the measured value of the standpipe pressure gauge deviates from a designed standpipe pressure, it is indicated that the bottomhole pressure has deviated from the designed bottomhole pressure; predicting and calculating a development trend of the bottomhole pressure by using the wellbore flow parameter analysis and correction module; determining a target pressure adjustment value; sending a target value to be adjusted to an automatic opening degree adjustment module for an automatic control throttle valve; sending a throttle valve adjustment instruction; and adjusting the automatic control throttle valve to make a measured value of the standpipe pressure coincident with a designed value.

Specifically, in the step S1, the fluid distribution in a wellbore annulus comprises an overflow height in the wellbore annulus, a gas holdup rate and a liquid holdup rate in the wellbore annulus, an air pressure distribution in the wellbore annulus, and a gas flow velocity and a liquid flow velocity in the wellbore annulus.

Specifically, in the step S1, the method for calculating the wellbore fluid distribution by using the wellbore flow parameter analysis and correction module is as follows:

S101: after the overflow occurs and before the well is shut in, measuring data in real time through an inlet flowmeter, an outlet flowmeter, and a standpipe pressure gauge so as to obtain the fluid distribution in the wellbore annulus in combination with a wellbore transient multiphase fluid mechanics model, wherein the wellbore transient multiphase fluid mechanics model and an initial calculation condition and a calculation boundary condition are as follows:

a calculation model:

$$\begin{cases} \text{gas-phase} \\ \text{continuity equation:} & \dfrac{\partial}{\partial z}(A\rho_g E_g v_g) + \dfrac{\partial}{\partial t}(A\rho_g E_g) = \Gamma_g \\ \text{liquid-phase} \\ \text{continuity equation:} & \dfrac{\partial}{\partial z}(A\rho_l E_l v_l) + \dfrac{\partial}{\partial t}(A\rho_l E_l) = 0 \\ \text{motion equation:} & \dfrac{\partial}{\partial t}(A\rho_l E_l v_l + A\rho_g E_g v_g) + \\ & \dfrac{\partial}{\partial z}(A\rho_l E_l v_l^2 + A\rho_g E_g v_g^2) + \\ & A\dfrac{\partial P}{\partial z} + A\rho_m g + A\left(\dfrac{\partial P}{\partial z}\right)_{fr} = 0 \end{cases}$$

the initial calculation condition:

$$\begin{cases} E_g(0, j) = 0, \ E_l(0, j) = 1 \\ v_g(0, j) = 0, \ v_l(0, j) = q_l/A \\ P(0, j) = \rho g j + P_f \end{cases}$$

the calculation boundary calculation condition:

$$\begin{cases} P_b(t) = P_{d\_measured}(t) + \rho g H - P_{d\_f} \\ q_o(t) = q_{o\_measured}(t) \end{cases}$$

wherein, A is a cross-sectional area of the annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in a continuity equation, kg/m/s; $\rho_l$ is a density of drilling fluid, kg/m$^3$; $E_l$ is a liquid holdup rate, $E_l+E_g=1$, dimensionless; $v_l$ is a flow velocity of drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where gas invasion occurs, m; t is time, s; $q_l$ is an inlet displacement of the drilling fluid, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of the wellhead annulus, L/s; $q_{o\_measured}(t)$ is an outlet displacement of the wellhead annulus measured at time t, L/s;

the wellbore transient multiphase fluid mechanics model is solved iteratively using an implicit difference method to obtain the fluid distribution in the wellbore annulus; and S102: during a period after shut-in to a stage before well-killing, measuring data by using a casing pressure gauge in real time; based on the fluid distribution state in the wellbore annulus before shut-in, obtaining the fluid distribution in the wellbore annulus by using a shut-in wellbore fluid mechanics model that takes into account shut-in after-flow and slippage effects, wherein the shut-in wellbore fluid mechanics model that takes into account shut-in after-flow and slippage effects is as follows:

$$\sum_{i=1}^{n} A_a(t,i)E_g(t,i)h_g(t,i) - \sum_{i=1}^{n} A_a(t-\Delta t,i)E_g(t-\Delta t,i)h_g(t-\Delta t,i) = \sum_{x=1}^{x} C_l \frac{P_x(t)-P_x(t-\Delta t)}{2} V_{lx}(t) + V_f(t)$$

wherein, $A_a(t,i)$ is a cross-section area of the annulus, m$^2$; $E_g(t,i)$ is a unit gas holdup rate, %; $h_g(t,i)$ is a unit length, m; $P_x(t)$ is a pressure at position x in the wellbore; $V_{lx}(t)$ is a volume of the drilling fluid in a wellbore unit, m$^3$; $V_f(t)$ is a filtration loss of the drilling fluid per unit time step, m$^3$; $\Delta t$ is a time step, s; and the shut-in wellbore fluid mechanics model that takes into account shut-in after-flow and slippage effects is solved by using a Gauss-Seidel iterative method to obtain the fluid distribution in the wellbore annulus.

Specifically, in the step S1, the normal positions of various gate valves when the throttle manifold is in a standby condition are as follows: a flat gate valve $J_{2a}$, a flat gate valve $J_{3b}$, a flat gate valve $J_{3a}$, a flat gate valve $J_5$, a flat gate valve $J_{6a}$, a flat gate valve $J_7$, a flat gate valve $J_8$, a flat gate valve 2#, and a flat gate valve 3# are opened, and a flat gate valve $J_{3b}$, a flat gate valve $J_9$, a flat gate valve $J_{11}$, a flat gate valve $J_{6b}$, a flat gate valve $J_{10}$, a flat gate valve 1#, and a flat gate valve 4# are closed;

Specifically, in the step S2, the method for adjusting the automatic control throttle valve is as follows: monitoring a measured value of the casing pressure gauge in real time, and comparing the measured value with the shut-in casing pressure value; when there is a deviation between the two values, sending the deviation value of the two values to the automatic opening degree adjustment module of the automatic throttle valve; sending a control instruction to the automatic control throttle valve through the automatic opening degree adjustment module of the automatic throttle valve; adjusting the opening degree of the throttle valve; and maintaining the wellhead casing pressure equal to the shut-in casing pressure.

Specifically, in the step S2, the method for determining whether the displacement reaches the designed well-killing displacement is as follows: determining whether the displacement has reached the designed well-killing displacement based on a measured/designed displacement curve of well-killing fluid in a measured/designed outlet and inlet displacement curve module in the intelligent throttled well-killing construction operation console.

Specifically, in the step S2, the method for updating and correcting the wellbore fluid distribution in real time comprises: measuring a well-killing fluid outlet placement, a well-killing fluid inlet displacement, a standpipe pressure and a casing pressure by using an inlet flowmeter, an outlet flowmeter, a standpipe pressure gauge and a casing pressure gauge in real time; and updating and correcting the wellbore fluid distribution obtained in step S1 in real time in combination with the wellbore transient multiphase fluid mechanics model; and the wellbore transient multiphase fluid mechanics model and an initial calculation condition and a calculation boundary condition are as follows:

$$\begin{cases} \text{gas-phase continuity equation:} & \frac{\partial}{\partial z}(A\rho_g E_g v_g) + \frac{\partial}{\partial t}(A\rho_g E_g) = \Gamma_g \\ \text{liquid-phase continuity equation:} & \frac{\partial}{\partial z}(A\rho_l E_l v_l) + \frac{\partial}{\partial t}(A\rho_l E_l) = 0 \\ \text{motion equation:} & \frac{\partial}{\partial t}(A\rho_l E_l v_l + A\rho_g E_g v_g) + \\ & \frac{\partial}{\partial z}(A\rho_l E_l v_l^2 + A\rho_g E_g v_g^2) + \\ & A\frac{\partial P}{\partial z} + A\rho_m g + A\left(\frac{\partial P}{\partial z}\right)_{fr} = 0 \end{cases}$$

the initial calculation condition:

$$\begin{cases} E_g(S2\_0, j) = E_g(S1\_end, j), E_l(S2\_0, j) = 1 - E_g(S1\_end, j) \\ v_g(S2\_0, j) = v_g(S1\_end, j), v_l(S2\_0, j) = v_l(S1\_end, j) \\ P(S2\_0, j) = P(S1\_end, j) \end{cases}$$

the boundary calculation condition:

$$\begin{cases} P_b(t) = P_{d\_measured}(t) + \rho g H - P_{d\_f} \\ q_o(t) = q_{o\_measured}(t), q_l(t) = q_{l\_measured}(t) \\ P_c(t) = P_{c\_measured}(t) \end{cases}$$

wherein, A is a cross-sectional area of the annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in a continuity equation, kg/m/s; $\rho_l$ is a density of drilling fluid, kg/m$^3$; $E_l$ is a liquid holdup rate, $E_l+E_g=1$, dimensionless; $v_l$ is a flow velocity of drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where gas invasion occurs, m; t is time, s; S2_0 is a start time of the step S2; S1_end is an end time of the step S1; $q_i(t)$ is an inlet displacement of the drilling fluid, L/s; $q_{l\_measured}(t)$ is an wellhead inlet displacement measured at time t, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of the wellhead annulus, L/s; $q_{o\_measured}(t)$ is an outlet displacement of the wellhead annulus measured at time t, L/s; $P_c(t)$ is a wellhead casing pressure, MPa; and $P_{c\_measured}(t)$ is a wellhead casing pressure measured at time t, MPa;

the wellbore transient multiphase fluid mechanics model is solved iteratively using an implicit difference method.

Specifically, in the step S3, the method for updating and correcting the wellbore fluid distribution in real time comprises: measuring a well-killing fluid outlet placement, a well-killing fluid inlet displacement, a standpipe pressure and a casing pressure by using an inlet flowmeter, an outlet flowmeter, a standpipe pressure gauge and a casing pressure gauge in real time; and updating and correcting the wellbore fluid distribution obtained in the step S2 in real time in combination with the wellbore transient multiphase fluid mechanics model; and the wellbore transient multiphase fluid mechanics model, the initial calculation condition and the calculation boundary condition are as follows:

$$\begin{cases} \text{gas-phase} \\ \text{continuity equation:} \end{cases} \frac{\partial}{\partial z}(A\rho_g E_g v_g) + \frac{\partial}{\partial t}(A\rho_g E_g) = \Gamma_g$$

$$\begin{cases} \text{liquid-phase} \\ \text{continuity equation:} \end{cases} \frac{\partial}{\partial z}(A\rho_l E_l v_l) + \frac{\partial}{\partial t}(A\rho_l E_l) = 0$$

$$\text{motion equation:} \quad \frac{\partial}{\partial t}(A\rho_l E_l v_l + A\rho_g E_g v_g) +$$
$$\frac{\partial}{\partial z}(A\rho_l E_l v_l^2 + A\rho_g E_g v_g^2) +$$
$$A\frac{\partial P}{\partial z} + A\rho_m g + A\left(\frac{\partial P}{\partial z}\right)_{fr} = 0$$

the initial calculation condition:

$$\begin{cases} E_g(S3\_0, j) = E_g(S2\_end, j), E_l(S3\_0, j) = 1 - E_g(S2\_end, j) \\ v_g(S3\_0, j) = v_g(S2\_end, j), v_l(S3\_0, j) = v_l(S2\_end, j) \\ P(S3\_0, j) = P(S2\_end, j) \end{cases}$$

the calculation boundary calculation condition:

$$\begin{cases} P_b(t) = P_{d\_measured}(t) + \rho g H - P_{d\_f} \\ q_o(t) = q_{o\_measured}(t), q_l(t) = q_{l\_measured}(t) \\ P_c(t) = P_{c\_measured}(t) \end{cases}$$

wherein, A is a cross-sectional area of the annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in a continuity equation, kg/m/s; $\rho_l$ is a density of drilling fluid, kg/m$^3$; $E_l$ is a liquid holdup rate, $E_l+E_g=1$, dimensionless; $v_l$ is a flow velocity of the drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is friction pressure drop, MPa/m; j is a position, m; $P_f$ is an annulus pressure loss, MPa; H is a well depth where gas invasion occurs, m; t is time, s; S3_0 is a start time in the step S3; S2_end is a start time of the step S2; $q_i(t)$ is an inlet displacement of the drilling fluid, L/s; $q_{l\_measured}(t)$ is a wellhead inlet displacement measured at time t, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of the wellhead annulus, L/s; a $q_{o\_measured}(t)$ is an outlet displacement of the wellhead annulus measured at time t, L/s; $P_c(t)$ is a wellhead casing pressure measured at time t, MPa; $P_{c\_measured}(t)$ is a wellhead casing pressure measured at time t, MPa; and the wellbore transient multiphase fluid mechanic model is solved iteratively using an implicit difference method.

Specifically, in the step S3, when the measured value of the standpipe pressure gauge deviates from the designed standpipe pressure, a development trend of the bottomhole pressure is predicated and calculated through the wellbore flow parameter analysis and correction module, and the method for determining the target pressure adjustment value is as follows:

the target pressure adjustment value is $\Delta P_b = \Delta P_{b1} + \Delta P_{b2} + \Delta P_{b3}$;

wherein, $\Delta P_b$ is the target pressure adjustment value, MPa; $\Delta P_{b1}$ is a deviation value at time (t1) when the measured value of the standpipe pressure gauge is monitored to deviate the designed standpipe pressure, MPa; $\Delta P_{b2}$ is a change value of the bottomhole pressure within a period (t0-t1) when bottomhole pressure waves are transmitted to the wellhead standpipe pressure gauge, MPa; $\Delta P_{b3}$ is a change in bottomhole pressure within a period (t1-t2) when a wellhead back pressure is transmitted to the bottomhole after the throttle valve is actuated, MPa; t0 is a time when the bottomhole pressure deviates from the design, s; t1 is a time when the measured value of the standpipe pressure gauge deviates from the designed standpipe pressure, s; t2 is a time when the wellhead back pressure is applied to the bottomhole after the opening degree of the automatic throttle valve is adjusted, s;

$$\Delta t_{0-1} = t1 - t0 = \frac{H}{v_{w\_in\_pipe}}$$

is a time length from time t0 to time t1, that is, the time required for the bottomhole pressure waves being transmitted to the wellhead standpipe pressure gauge, s; H is a well depth, m; $v_{w\_in\_pipe}$ is a pressure wave propagation velocity in the drill string, m/s;

$$\Delta t_{1-2} = t2 - t1 = \frac{H}{v_{w\_in\_annulus}}$$

is a time length from time t1 to time t2, that is, the time length that pressure waves of the wellhead back pressure are transmitted to the bottomhole after the opening degree of the automatic throttle valve is adjusted, s; $v_{w\_in\_annulus}$ is a pressure wave propagation velocity in the annulus, m/s;

the calculation method of $\Delta P_{b1}$ is $\Delta P_{b1} = P_{d\_measured} - P_{d\_designed}$;

wherein, $P_{d\_measured}$ is a measured value of the standpipe pressure gauge when the standpipe pressure deviates, MPa; $P_{d\_designed}$ is a designed standpipe pressure value, MPa;

the calculation method of $\Delta P_{b2}$ is as follows: predicting a bottomhole pressure at time t1 after $\Delta t_{0-1}$ by taking a parameter at time t0 as an initial state by using the wellbore transient multiphase fluid mechanics model;

the wellbore transient multiphase fluid mechanics model and an initial calculation condition and a calculation boundary condition are as follows:

$$\begin{cases} \text{gas-phase} \\ \text{continuity equation:} & \frac{\partial}{\partial z}(A\rho_g E_g v_g) + \frac{\partial}{\partial t}(A\rho_g E_g) = \Gamma_g \\ \text{liquid-phase} \\ \text{continuity equation:} & \frac{\partial}{\partial z}(A\rho_l E_l v_l) + \frac{\partial}{\partial t}(A\rho_l E_l) = 0 \\ \text{motion equation:} & \frac{\partial}{\partial t}(A\rho_l E_l v_l + A\rho_g E_g v_g) + \\ & \frac{\partial}{\partial z}(A\rho_l E_l v_l^2 + A\rho_g E_g v_g^2) + \\ & A\frac{\partial P}{\partial z} + A\rho_m g + A\left(\frac{\partial P}{\partial z}\right)_{fr} = 0 \end{cases}$$

the initial calculation condition:

$$\begin{cases} E_g(0, j) = E_g(t0, j), E_l(0, j) = 1 - E_g(t0, j) \\ v_g(0, j) = v_g(t0, j), v_l(0, j) = v_l(t0, j) \\ P(0, j) = P(t0, j) \end{cases}$$

the calculation boundary condition:

$$\begin{cases} P_b(t) = P_{d\_measured}(t0) + \rho g H - P_{d\_f} \\ q_o(t) = q_{o\_measured}(t0), q_l(t) = q_{l\_measured}(t0) \\ P_c(t) = P_{c\_measured}(t0) \end{cases}$$

wherein, A is a cross-sectional area in the annulus, m²; $\rho_g$ is a gas density, kg/m³; $E_g$ is a gas holdup rate, dimensionless; $v_g$ is a gas flow rate, m/s; $\Gamma_g$ is a gas source term in a continuity equation, kg/m/s; $\rho_l$ is a density of the drilling fluid, kg/m³; $E_l$ is a liquid holdup rate, $E_l + E_g = 1$, dimensionless; $v_l$ is a flow velocity of the drilling fluid, m/s; P is a pressure, Pa; $\rho_m$ is a density of a mixture, $\rho_m = \rho_l E_l + \rho_g E_g$, kg/m³;

$$\left(\frac{\partial P}{\partial z}\right)_{fr}$$

is a friction pressure drop, MPa/m; j is a position, m; $P_f$ is an annulus pressure loss, MPa; H is a well depth where gas invasion occurs, m; t is time, s; $q_l(t)$ is an inlet displacement of the drilling fluid, L/s; $q_{l\_measured}(t0)$ is a wellhead inlet displacement measured at time t0, L/s; $P_b(t)$ is a bottomhole pressure at time t0, MPa; $P_{d\_measured}(t0)$ is a standpipe pressure measured at time t0, MPa; $P_{d\_f}$ is a pressure loss in the drill string, MPa; $q_o(t)$ is an outlet displacement of the wellhead annulus, L/s; $q_{o\_measured}(t0)$ is an outlet displacement of the wellhead annulus measured at time t0, L/s; $P_c(t)$ is a wellhead casing pressure, MPa; $P_{c\_measured}(t0)$ is a wellhead casing pressure measured at time t0, MPa; and solving a bottomhole pressure $P_b(t1)$ at time t1 by the wellbore transient multiphase fluid mechanics model iteratively by using an implicit difference method;

the calculation formula $\Delta P_{b2}$ is $\Delta P_{b2} = P_b(t1) - P_{d\_measured}$;

the calculation method of $\Delta P_{b3}$ is as follows: predicting a bottomhole pressure at time t2 after $\Delta t_{1-2}$ by taking a parameter at time t1 as an initial state by using the wellbore transient multiphase fluid mechanics model;

the wellbore transient multiphase fluid mechanics model and an initial calculation condition and a calculation boundary condition are as follows:

$$\begin{cases} \text{gas-phase} \\ \text{continuity equation:} & \frac{\partial}{\partial z}(A\rho_g E_g v_g) + \frac{\partial}{\partial t}(A\rho_g E_g) = \Gamma_g \\ \text{liquid-phase} \\ \text{continuity equation:} & \frac{\partial}{\partial z}(A\rho_l E_l v_l) + \frac{\partial}{\partial t}(A\rho_l E_l) = 0 \\ \text{motion equation:} & \frac{\partial}{\partial t}(A\rho_l E_l v_l + A\rho_g E_g v_g) + \\ & \frac{\partial}{\partial z}(A\rho_l E_l v_l^2 + A\rho_g E_g v_g^2) + \\ & A\frac{\partial P}{\partial z} + A\rho_m g + A\left(\frac{\partial P}{\partial z}\right)_{fr} = 0 \end{cases}$$

the initial calculation condition:

$$\begin{cases} E_g(0, j) = E_g(t1, j), E_l(0, j) = 1 - E_g(t1, j) \\ v_g(0, j) = v_g(t1, j), v_l(0, j) = v_l(t1, j) \\ P(0, j) = P(t1, j) \end{cases}$$

the calculation boundary calculation condition:

$$\begin{cases} P_b(t) = P_{d\_measured}(t1) + \rho g H - P_{d\_f} \\ q_o(t) = q_{o\_measured}(t1), q_l(t) = q_{l\_measured}(t1) \\ P_c(t) = P_{c\_measured}(t1) \end{cases}$$

wherein, A is a cross-sectional area of the annulus, m²; $\rho_g$ is a gas density, kg/m³; $E_g$ is a gas holdup rate, dimensionless; $v_g$ is a gas flow rate, m/s; $\Gamma_g$ is a gas source term in a continuity equation, kg/m/s; $\rho_l$ is a density of the drilling fluid, kg/m³; $E_l$ is a liquid holdup rate, $E_l + E_g = 1$, dimensionless; $v_l$ is a flow velocity of the drilling fluid, m/s; P is a pressure, Pa; $\rho_m$ is a density of a mixture, $\rho_m = \rho_l E_l + \rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where gas invasion occurs, m; t is time, s; $q_i(t)$ is a drilling fluid inlet displacement, L/s; $q_{i\_measured}(t1)$ is a wellhead inlet displacement measured at time t1, L/s; $P_b(t)$ is a bottomhole pressure at time t0, MPa; $P_{d\_measured}(t1)$ is a standpipe pressure measured at time t1, MPa; $P_{d\_f}$ is a pressure loss in the drill string, MPa; $q_o(t)$ is an outlet displacement of the wellhead annulus, L/s; $q_{o\_measured}(t1)$ is an outlet displacement of the wellhead annulus measured at time t1, L/s; $P_c(t)$ is a wellhead casing pressure, MPa; $P_{c\_measured}(t1)$ is a wellhead casing pressure measured at time t1, MPa; and solving a bottomhole pressure $P_b(t2)$ at time t2 by the wellbore transient multiphase fluid mechanics model iteratively by using an implicit difference method;

the calculation formula $\Delta P_{b3}$ of is $\Delta P_{b3} = P_b(t2) - P_b(t1)$.

An intelligent throttled well-killing apparatus for overflow in high-temperature and high-pressure deep drilling, comprising an inlet flowmeter, an outlet flowmeter, a standpipe pressure gauge, a casing pressure gauge, an automatic control throttle valve, a manual control throttle valve, flat gate valves, an intelligent throttled well-killing construction operation console and a data acquisition and control line;

specifically, the inlet flowmeter is installed at a well-killing fluid inlet and configured to measure an inlet flow in real time;

specifically, the standpipe pressure gauge is installed at the well-killing fluid inlet and configured to measure a standpipe pressure in real time;

specifically, the outlet flowmeter is installed at a well-killing fluid outlet and configured to measure an outlet flow in real time;

specifically, the casing pressure gauge is installed at a throttle manifold and configured to measure a casing pressure in real time;

specifically, the automatic control throttle valve is installed at a throttle manifold and configured to adjust an opening degree according to instructions, and has a working pressure of above 70 MPa;

specifically, the manual control throttle valve is installed at the throttle manifold and configured to manually adjust the opening degree according to instructions;

specifically, the flat gate valves are installed on the throttle manifold, a blowout prevention pipeline and a relief pipeline, and can be opened and closed according to requirements to control drilling fluid to flow;

specifically, the data acquisition and control line connects the inlet flowmeter, the outlet flowmeter, the standpipe pressure gauge, the casing pressure gauge, the automatic control throttle valve and the intelligent throttled well-killing construction operation console, and configured to transmit instructions for measuring data in real time and controlling the opening degree of the automatic control throttle valve;

specifically, the intelligent throttled well-killing construction operation console comprises a measurement parameter display module, a wellbore flow parameter analysis and correction module, an automatic opening degree adjustment module for an automatic control throttle valve, a real-time casing pressure curve module, a real-time standpipe pressure curve module, a designed standpipe pressure curve module, a designed casing pressure curve module, and a measured inlet displacement curve module;

specifically, the measurement parameter display module is configured to display inlet flowmeter readings, standpipe pressure gauge readings, outlet flowmeter readings, casing pressure measuring meter readings, opening degree readings of the automatic control throttle valve, and opening degree adjustment instruction parameters of the automatic control throttle valve, which are currently collected in real time;

specifically, the wellbore flow parameter analysis and correction module is configured to establish a wellbore flow parameter analysis and correction model based on a multiphase flow theory in combination with data measured by the inlet flowmeter, the standpipe pressure gauge, the outlet flowmeter and the casing pressure gauge, and calculate an overflow height in a wellbore annulus, a gas holdup rate and a liquid holdup rate in the wellbore annulus, a pressure distribution in the wellbore annulus, and a gas flow velocity and a liquid flow velocity in the wellbore annulus;

specifically, the automatic opening degree adjustment module of the automatic control throttle valve is configured to send a control instruction to the automatic control throttle valve by taking a prediction result of the wellbore flow parameter analysis and correction module as an adjustment basis so as to automatically control the opening degree, and control the bottomhole pressure within a design range;

specifically, the measured/designed inlet displacement curve module is configured to draw data of the outlet and inlet displacements measured/designed by the outlet and inlet flowmeters, which are distributed over time, into a visual graph;

specifically, the measured casing pressure curve module is configured to draw data of the casing pressure measured by the casing pressure gauge, which are distributed over time, into a visual graph;

specifically, the measured standpipe pressure curve module is configured to draw data of the standpipe pressure measured by the standpipe pressure gauge, which are distributed over time, into a visual graph; and specifically, the designed standpipe pressure curve module is configured to draw data of the designed standpipe pressure, which are distributed over time, into a visual graph; and the designed casing pressure curve module is configured to draw data of the designed casing pressure, which are distributed over time, into a visual graph.

The present invention has the following beneficial effects:

(1) the accuracy of well-killing control is improved, and the pressure control value is accurately calculated in consideration of the effects of a pressure wave propagation speed and a back pressure delay, thereby reducing the effects of pressure wave propagation delay and facilitating the well-killing operation of high-temperature and high-pressure deep wells;

(2) the operations are convenient, and software automatic calculation and control is adopted, without the need for staff to manually adjust the opening degree of the throttle valve, thereby improving the smoothness and accuracy of throttle valve control, and reducing the dependence on operating experiences; and (3) few equipment demands are needed with relatively low cost, and it is only necessary to upgrade one manual control throttle valve in the existing throttle manifolds in a well site into an automatic control throttle valve, in combination with related software.

In drawings, reference symbols represent the following components: 1—drilling fluid tank; 2—drilling pump; 3—intelligent throttled well—killing construction operation console; 4—data acquisition and control line; 5—blowout preventer; 6—throttle manifold; 7—well-killing manifold; 8—drill string; 9—annulus; 10—overflow; 11—drill bit; 12—measurement parameter display module; 13—wellbore flow parameter analysis and correction module; 14—automatic opening degree adjustment module of an automatic control throttle valve; 15—measured/designed inlet and outlet displacement curve module; 16—measured casing pressure curve module; 17—measured standpipe pressure curve module; 18—designed standpipe pressure curve module; 19—designed casing pressure curve module; F1—inlet flowmeter; F2—outlet flowmeter; G1—standpipe pressure gauge; G2—casing pressure gauge; J1—automatic control throttle valve; J4—manual control throttle valve; flat gate valves 1#, 2#, 3#, 4#, J2a, J2b, J3a, J3b, J5, J6a, J6b, J7, J8, J9, J10.

DETAILED DESCRIPTION OF THE EMBODIMENTS

The technical solution of the present invention is described in further detail below with reference to the accompanying drawings, but the protection scope of the present invention is not limited to the followings.

Figure 1:
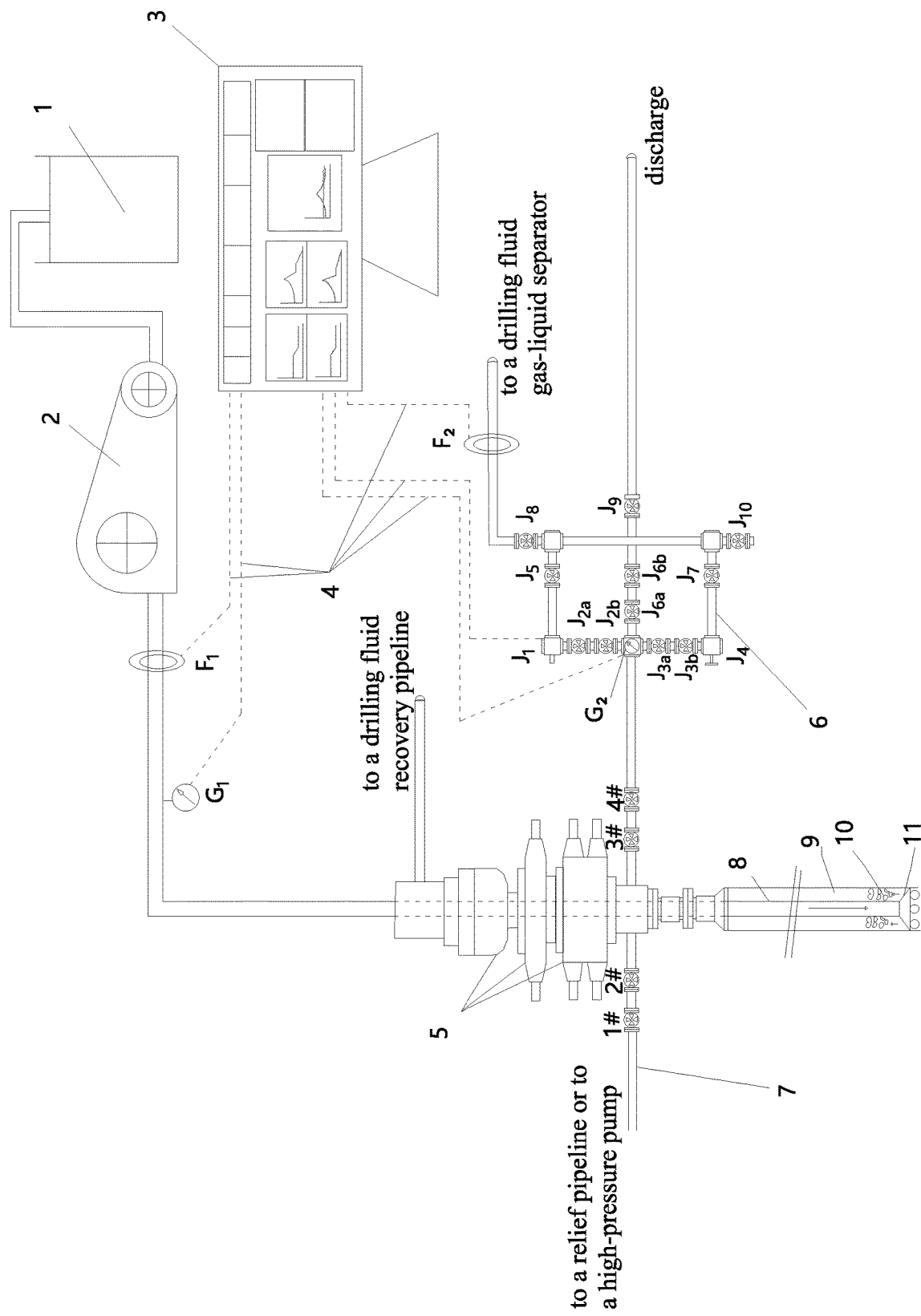
FIG. 1 is a schematic diagram of an intelligent throttled well-killing device for overflow in high-temperature and high-pressure deep drilling according to the present invention.
Figure 2:
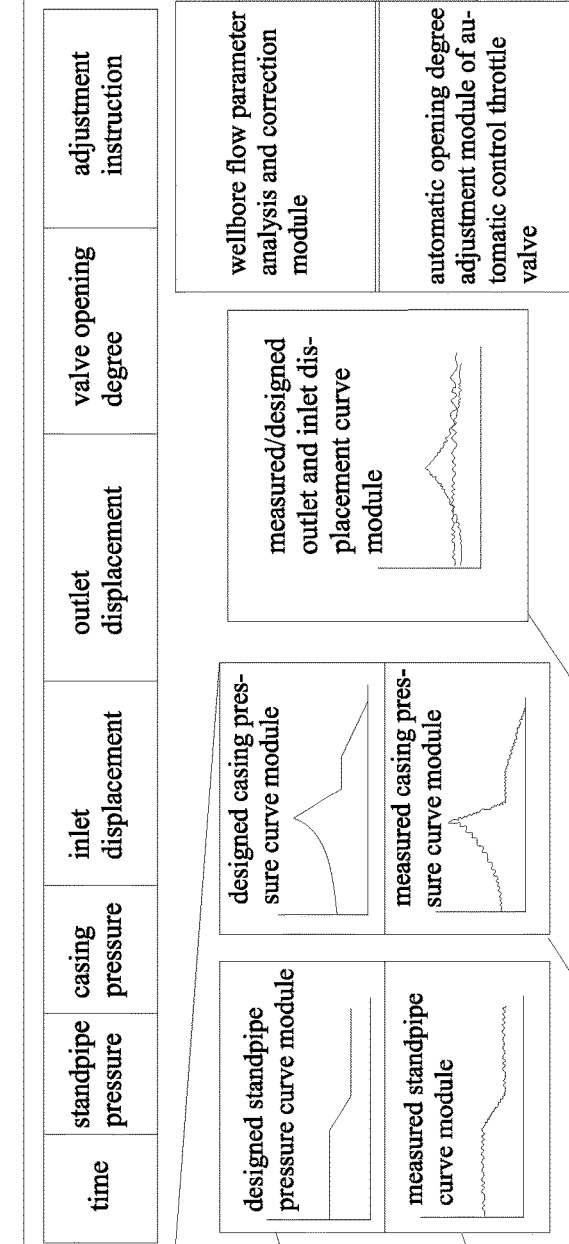
FIG. 2 shows an intelligent throttled well-killing construction operation console of the intelligent throttled well-killing device for overflow in high-temperature and high-pressure deep drilling according to the present invention.

As shown in FIG. 1, an intelligent throttled well-killing device for overflow in high-temperature and high-pressure deep drilling comprises an inlet flowmeter F1, an outlet flowmeter F2, a standpipe pressure gauge G1, a casing pressure gauge G2, an automatic control throttle valve J1, a manual control throttle valve J4, flat gate valves (1#, 2#, 3#, 4#, J2a, J2b, J3a, J3b, J5, J6a, J6b, J7, J8, J9, J10), an intelligent throttled well-killing construction operation console 3, and a data acquisition and control line 4.

The inlet flowmeter F1 is installed at a well-killing fluid inlet and configured to measure an inlet flow in real time; the standpipe pressure gauge G1 is installed at the well-killing fluid inlet and configured to measure a standpipe pressure in real time; the outlet flowmeter F2 is installed at a well-killing fluid outlet and configured to measure an outlet flow in real time; the casing pressure gauge G2 is installed at a throttle manifold and configured to measure a casing pressure in real time; the automatic control throttle valve J1 is installed at a throttle manifold 6 and configured to adjust an opening degree according to instructions, and has a working pressure of above 70 MPa; the data acquisition and control line 4 connects the inlet flowmeter F1, the outlet flowmeter F2, the standpipe pressure gauge G1, the casing pressure gauge G2, the automatic control throttle valve J1 and the intelligent throttled well-killing construction operation console 3, and configured to transmit instructions for measuring data measured by the inlet flowmeter F1, the outlet flowmeter F2, the standpipe pressure gauge G1 and the casing pressure gauge G2 and controlling the opening degree of the automatic control throttle valve J1; the manual control throttle valve J4 is installed at the throttle manifold and configured to manually adjust the opening degree according to instructions; the flat gate valves (1#, 2#, 3#, 4#, J2a, J2b, J3a, J3b, J5, J6a, J6b, J7, J8, J9, J10) are installed on the throttle manifold 6 and a well-killing manifold 7, can be opened and closed as needed and configured to control a flowing channel of drilling fluid; the intelligent throttled well-killing construction operation console 3 comprises a measurement parameter display module 12, a wellbore flow parameter analysis and correction module 13, an automatic opening degree adjustment module 14 of the automatic control throttle valve, a measured outlet and inlet displacement curve module 15, a measured casing pressure curve module 16, a measured standpipe pressure curve module 17, a designed standpipe pressure curve module 18, a designed casing pressure curve module 19; the measurement parameter display module 12 is configured to display inlet flowmeter F1 readings, a standpipe pressure gauge G1 readings, outlet flowmeter F2 readings, casing pressure gauge G2 readings, automatic control throttle valve J1 opening degree readings, and automatic control throttle value opening degree adjustment instruction parameters, which are currently collected in real time; the wellbore flow parameter analysis and correction module 13 is configured to establish a wellbore flow parameter analysis and correction model based on a multiphase flow theory in combination with data measured by the inlet flowmeter F1, the standpipe pressure gauge G1, the outlet flowmeter F2 and the casing pressure gauge G2; the automatic control throttle valve opening degree automatic adjustment module 14 is configured to send a control instruction to the automatic control throttle valve J1 by taking a prediction result of the wellbore flow parameter analysis and correction module as an adjustment basis so as to automatically control the opening degree, and control the bottomhole pressure within a design range; the measured/designed inlet displacement curve module 15 is configured to draw data of the outlet and inlet displacements measured by the inlet flowmeter F1 and the outlet flowmeter F2, which are distributed over time, into a visual graph; the measured casing pressure curve module 16 is configured to draw data of the casing pressure measured by the casing pressure gauge G2, which are distributed over time, into a visual graph; the measured standpipe pressure curve module 17 is configured to draw data of the standpipe pressure measured by the standpipe pressure gauge G1, which are distributed over time, into a visual graph; the designed standpipe pressure curve module 18 is configured to draw data of the designed standpipe pressure, which are distributed over time, into a visual graph; and the designed casing pressure curve module 19 is configured to draw data of the designed casing pressure, which are distributed over time, into a visual graph.

An intelligent throttled well-killing method for overflow in high-temperature and high-pressure deep drilling comprises the following steps:

S1. before well-killing starts, solving a formation pressure and a designed standpipe pressure by closing a blowout preventer 5; calculating a wellbore fluid distribution by using a wellbore flow parameter analysis and correction module 13; displaying designed standpipe pressure data during well-killing on a designed standpipe pressure curve module 18 in an intelligent throttled well-killing construction operation console 3; displaying designed casing pressure data on a designed casing pressure curve module 19 in the intelligent throttled well-killing construction operation console 3; displaying designed well-killing displacement data on a measured/designed outlet and inlet displacement curve module 15 in the intelligent throttled well-killing construction operation console 3; inspecting whether a switch position of each gate valve is normal, so that the throttle manifold is in a standby condition.

In the step S1, the fluid distribution in a wellbore annulus comprises an overflow height in the wellbore annulus, a gas holdup rate and a liquid holdup rate in the wellbore annulus, a pressure distribution in the wellbore annulus, and a gas flow velocity and a liquid flow velocity in the wellbore annulus.

In the step S1, the method for calculating the wellbore fluid distribution by the wellbore flow parameter analysis and correction module 13 is as follows:

S101: during a period after the overflow occurs to the stage before shut-in, measuring data in real time through the inlet flowmeter F1, the outlet flowmeter F2, and the standpipe pressure gauge G1 to obtain the fluid distribution in the wellbore annulus in combination with the wellbore transient multiphase fluid mechanic model;

the wellbore transient multiphase fluid mechanics model and an initial calculation condition and a calculation boundary condition are as follows:

a calculation model:

$$\begin{cases} \text{gas-phase} \\ \text{continuity equation:} \end{cases} \frac{\partial}{\partial z}(A\rho_g E_g v_g) + \frac{\partial}{\partial t}(A\rho_g E_g) = \Gamma_g$$

$$\begin{cases} \text{liquid-phase} \\ \text{continuity equation:} \end{cases} \frac{\partial}{\partial z}(A\rho_l E_l v_l) + \frac{\partial}{\partial t}(A\rho_l E_l) = 0$$

$$\text{motion equation:} \quad \frac{\partial}{\partial t}(A\rho_l E_l v_l + A\rho_g E_g v_g) +$$
$$\frac{\partial}{\partial z}(A\rho_l E_l v_l^2 + A\rho_g E_g v_g^2) +$$
$$A\frac{\partial P}{\partial z} + A\rho_m g + A\left(\frac{\partial P}{\partial z}\right)_{fr} = 0$$

the initial calculation condition:

$$\begin{cases} E_g(0, j) = 0, E_l(0, j) = 1 \\ v_g(0, j) = 0, v_l(0, j) = q_l/A \\ P(0, j) = \rho g j + P_f \end{cases}$$

the calculation boundary condition:

$$\begin{cases} P_b(t) = P_{d\_measured}(t) + \rho g H - P_{d\_f} \\ q_o(t) = q_{o\_measured}(t) \end{cases}$$

wherein, A is a cross-sectional area of the annulus, m²; $\rho_g$ is a gas density, kg/m³; $E_g$ is a gas holdup rate, dimensionless; $v_g$ is a gas flow rate, m/s; $\Gamma_g$ is a gas source term in a continuity equation, kg/m/s; $\rho_l$ is a density of drilling fluid, kg/m³; $E_l$ is a liquid holdup rate, $E_l+E_g=1$, dimensionless; $v_l$ is a flow velocity of drilling fluid, m/s; P is a pressure, Pa; $\rho_m$ is a density of a mixture, $\rho_m = \rho_l E_l + \rho_g E_g$, kg/m³;

$$\left(\frac{\partial P}{\partial z}\right)_{fr}$$

is a friction pressure drop, MPa/m; j is a position, m; $P_f$ is an annulus pressure loss, MPa; H is a well depth where gas invasion occurs, m; t is time, s; $q_l$ is an inlet displacement of the drilling fluid, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of the wellhead annulus, L/s; $q_{o\_measured}(t)$ is an outlet displacement of the wellhead annulus measured at time t, L/s.

The wellbore transient multiphase fluid mechanics model is solved iteratively using an implicit difference method to obtain the wellbore annulus fluid distribution.

S102: during a period after shut-in to a stage before well-killing, measuring data by using a casing pressure gauge G2 in real time; based on the fluid distribution state in the wellbore annulus before shut-in, obtaining the fluid distribution in the wellbore annulus by using a shut-in wellbore fluid mechanics model that takes into account shut-in after-flow and slippage effects.

The shut-in wellbore fluid mechanics model that takes into account shut-in after-flow and slippage effects is as follows:

$$\sum_{i=1}^{n} A_a(t, i) E_g(t, i) h_g(t, i) - \sum_{i=1}^{n} A_1(t - \Delta t, i) E_g(t - \Delta t, i) h_g(t - \Delta t, i) =$$
$$\sum_{x=1}^{X} C_l \frac{P_x(t) - P_x(t - \Delta t)}{2} V_{lx}(t) + V_f(t)$$

wherein, $A_a(t,i)$ is a cross-section area of the annulus, m²; $E_g(t,i)$ is a unit gas holdup rate, %; $h_g(t,i)$ is a unit length, m; $P_x(t)$ is a pressure at position x in the wellbore; $V_{lx}(t)$ is a volume of the drilling fluid in a wellbore unit, m³; $V_f(t)$ is a filtration loss of the drilling fluid per unit time step, m³; $\Delta t$ is a time step, s.

The shut-in wellbore fluid mechanics model that takes into account shut-in after-flow and slippage effects is solved by using a Gauss-Seidel iterative method to obtain the fluid distribution in the wellbore annulus.

In the step S1, the normal positions of various gate valves when the throttle manifold is in the standby condition are as follows: a flat gate valve $J_{2a}$, a flat gate valve $J_{3b}$, a flat gate valve $J_{3a}$, a flat gate valve $J_5$, a flat gate valve $J_{6a}$, a flat gate valve $J_7$, a flat gate valve $J_8$, a flat gate valve 2#, and a flat gate valve 3# are opened, and a flat gate valve $J_{3b}$, a flat gate valve $J_9$, a flat gate valve $J_{11}$, a flat gate valve $J_{6b}$, a flat gate valve $J_{10}$, a flat gate valve 14, and a flat gate valve 4# are closed.

S2. opening a flat gate valve 3# and slowly starting a mud pump 2; injecting well-killing fluid in a drilling fluid tank 1 into a wellbore through a drill string 8; adjusting an automatic control throttle valve $J_1$ to make a measured value of a casing pressure gauge G2 equal to a shut-in casing pressure and keep it unchanged until the displacement reaches the designed well-killing displacement, and during this period, updating and correcting the wellbore fluid distribution in real time through the wellbore flow parameter analysis and correction module 13.

In the step S2, the method for adjusting the automatic control throttle valve $J_1$ is as follows: monitoring a measured value of the casing pressure gauge G2 in real time, and comparing the measured value with the shut-in casing pressure value; when there is a deviation between the two values, sending the deviation value of the two values to the automatic opening degree adjustment module 14 of the automatic throttle valve; sending a control instruction to the automatic control throttle valve J1 through the automatic opening degree adjustment module 14 of the automatic throttle valve; adjusting the opening degree of the throttle valve; and maintaining the wellhead casing pressure equal to the shut-in casing pressure.

In the step S2, the method for determining whether the displacement reaches the designed well-killing displacement is as follows: determining whether the displacement has reached the designed well-killing displacement based on a measured/designed displacement curve of well-killing fluid in a measured/designed outlet and inlet displacement curve module 15 in the intelligent throttled well-killing construction operation console 3.

In the step S2, the method for updating and correcting the wellbore fluid distribution in real time includes: measuring a well-killing fluid outlet displacement, a well-killing fluid inlet displacement, a standpipe pressure and a casing pressure by using the inlet flowmeter $F_1$, the outlet flowmeter $F_2$, the standpipe pressure gauge $G_1$ and the casing pressure gauge $G_2$ in real time; and updating and correcting the wellbore fluid distribution obtained in the step S1 in real time in combination with the wellbore transient multiphase fluid mechanics model;

the wellbore transient multiphase fluid mechanics model and an initial calculation condition and a calculation boundary condition are as follows:

$$\begin{cases} \text{gas-phase continuity equation:} & \frac{\partial}{\partial z}(A\rho_g E_g v_g) + \frac{\partial}{\partial t}(A\rho_g E_g) = \Gamma_g \\ \text{liquid-phase continuity equation:} & \frac{\partial}{\partial z}(A\rho_l E_l v_l) + \frac{\partial}{\partial t}(A\rho_l E_l) = 0 \\ \text{motion equation:} & \frac{\partial}{\partial t}(A\rho_l E_l v_l + A\rho_g E_g v_g) + \\ & \frac{\partial}{\partial z}(A\rho_l E_l v_l^2 + A\rho_g E_g v_g^2) + \\ & A\frac{\partial P}{\partial z} + A\rho_m g + A\left(\frac{\partial P}{\partial z}\right)_{fr} = 0 \end{cases}$$

the initial calculation condition:

$$\begin{cases} E_g(S2\_0, j) = E_g(S1\_end, j), E_l(S2\_0, j) = 1 - E_g(S1\_end, j) \\ v_g(S2\_0, j) = v_g(S1\_end, j), v_l(S2\_0, j) = v_l(S1\_end, j) \\ P(S2\_0, j) = P(S1\_end, j) \end{cases}$$

the boundary calculation condition:

$$\begin{cases} P_b(t) = P_{d\_measured}(t) + \rho g H - P_{d\_f} \\ q_o(t) = q_{o\_measured}(t), q_l(t) = q_{l\_measured}(t) \\ P_c(t) = P_{c\_measured}(t) \end{cases}$$

wherein, A is a cross-sectional area of the annulus, $m^2$; $\rho_g$ is a gas density, $kg/m^3$; $E_g$ is a gas holdup rate, dimensionless; $v_g$ is a gas flow rate, m/s; $\Gamma_g$ is a gas source term in a continuity equation, kg/m/s; $\rho_l$ is a density of drilling fluid, $kg/m^3$; $E_l$ is a liquid holdup rate, $E_l+E_g=1$, dimensionless; $v_l$ is a flow velocity of drilling fluid, m/s; P is a pressure, Pa; $\rho_m$ is a density of a mixture, $\rho_m=\rho_l E_l+\rho_g E_g$, $kg/m^3$;

$\left(\frac{\partial P}{\partial z}\right)_{fr}$ is a friction pressure drop, MPa/m; j is a position, m; $P_f$ is an annulus pressure loss, MPa; H is a well depth where gas invasion occurs, m; t is time, s; S2_0 is a start time of the step S2; S1_end is an end time of the step S1; $q_i(t)$ is an inlet displacement of the drilling fluid, L/s; $q_{l\_measured}(t)$ is an wellhead inlet displacement measured at time t, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of the wellhead annulus, L/s; $q_{l\_measured}(t)$ is an outlet displacement of the wellhead annulus measured at time t, L/s; $P_c(t)$ is a wellhead casing pressure, MPa; and $P_{c\_measured}(t)$ is a wellhead casing pressure measured at time t, MPa.

The wellbore transient multiphase fluid mechanics model is solved iteratively using an implicit difference method to obtain the wellbore annulus fluid distribution.

S3. keeping the displacement of the well-killing fluid constant, and injecting the well-killing fluid in the drilling fluid tank 1 into the wellbore through the drill string 8; gradually discharging overflow 10 above a drill bit 11 from the wellbore through the annulus 9, and during this period, updating and correcting the wellbore fluid distribution in real time through the wellbore flow parameter analysis and correction module 13, wherein when the measured value of the standpipe pressure gauge $G_1$ deviates from the designed standpipe pressure, it is indicated that the bottomhole pressure has deviated from the designed bottomhole pressure; predicting and calculating a development trend of the bottomhole pressure by using the wellbore flow parameter analysis and correction module 13; determining a target pressure adjustment value $\Delta P_b$; sending a target value $\Delta P_b$ to be adjusted to an automatic opening degree adjustment module 14 for an automatic control throttle valve; sending a throttle valve adjustment instruction; and adjusting the automatic control throttle valve $J_1$ to make a measured value of the standpipe pressure coincident with a designed value.

In the step S3, the method for updating and correcting the wellbore fluid distribution in real time includes: measuring a well-killing fluid outlet displacement, a well-killing fluid inlet displacement, a standpipe pressure and a casing pressure by using the inlet flowmeter $F_1$, the outlet flowmeter $F_2$, the standpipe pressure gauge $G_1$ and the casing pressure gauge $G_2$ in real time; and updating and correcting the wellbore fluid distribution obtained in the step S1 in real time in combination with the wellbore transient multiphase fluid mechanics model;

the wellbore transient multiphase fluid mechanics model is as follows:

$$\begin{cases} \text{gas-phase continuity equation:} & \frac{\partial}{\partial z}(A\rho_g E_g v_g) + \frac{\partial}{\partial t}(A\rho_g E_g) = \Gamma_g \\ \text{liquid-phase continuity equation:} & \frac{\partial}{\partial z}(A\rho_l E_l v_l) + \frac{\partial}{\partial t}(A\rho_l E_l) = 0 \\ \text{motion equation:} & \frac{\partial}{\partial t}(A\rho_l E_l v_l + A\rho_g E_g v_g) + \\ & \frac{\partial}{\partial z}(A\rho_l E_l v_l^2 + A\rho_g E_g v_g^2) + \\ & A\frac{\partial P}{\partial z} + A\rho_m g + A\left(\frac{\partial P}{\partial z}\right)_{fr} = 0 \end{cases}$$

the initial calculation condition:

$$\begin{cases} E_g(S3\_0, j) = E_g(S2\_end, j), E_l(S3\_0, j) = 1 - E_g(S2\_end, j) \\ v_g(S3\_0, j) = v_g(S2\_end, j), v_l(S3\_0, j) = v_l(S2\_end, j) \\ P(S3\_0, j) = P(S2\_end, j) \end{cases}$$

the calculation boundary condition:

$$\begin{cases} P_b(t) = P_{d\_measured}(t) + \rho g H - P_{d\_f} \\ q_o(t) = q_{o\_measured}(t), q_l(t) = q_{l\_measured}(t) \\ P_c(t) = P_{c\_measured}(t) \end{cases}$$

wherein, A is a cross-sectional area of the annulus, m²; $\rho_g$ is a gas density, kg/m³; $E_g$ is a gas holdup rate, dimensionless; $v_g$ is a gas flow rate, m/s; $\Gamma_g$ is a gas source term in a continuity equation, kg/m/s; $\rho_l$ is a density of drilling fluid, kg/m³; $E_l$ is a liquid holdup rate, $E_l+E_g=1$, dimensionless; $v_l$ is a flow velocity of the drilling fluid, m/s; P is a pressure, Pa; $\rho_m$ is a density of a mixture, $\rho_m=\rho_l E_l+\rho_g E_g$, kg/m³;

$$\left(\frac{\partial P}{\partial z}\right)_{fr}$$

is a friction pressure drop, MPa/m; j is a position, m; $P_f$ is an annulus pressure loss, MPa; H is a well depth where gas invasion occurs, m; t is time, s; S3_0 is a start time in the step S3; S2_end is a start time of the step S2; $q_l(t)$ is an inlet displacement of the drilling fluid, L/s; $q_{l\_measured}(t)$ is a wellhead inlet displacement measured at time t, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of the wellhead annulus, a L/s; $q_{o\_measured}(t)$ is an outlet displacement of the wellhead annulus measured at time t, L/s; $P_c(t)$ is a wellhead casing pressure measured at time t, MPa; $P_{c\_measured}(t)$ is a wellhead casing pressure measured at time t, MPa.

The wellbore transient multiphase fluid mechanics model is solved iteratively using an implicit difference method.

In the step S3, when the measured value of the standpipe pressure gauge $F_1$ deviates from the designed standpipe pressure, a development trend of the bottomhole pressure is predicated and calculated through the wellbore flow parameter analysis and correction module 13, and the method for determining the target pressure adjustment value is as follows:

the target pressure adjustment value is $\Delta P_b = \Delta P_{b1} \Delta P_{b2} + \Delta P_{b3}$;

wherein, $\Delta P_b$ is the target pressure adjustment value, MPa; $\Delta P_{b1}$ is a deviation value at time (t1) when the measured value of the standpipe pressure gauge $F_1$ is monitored to deviate the designed standpipe pressure, MPa; $\Delta P_{b2}$ is a change value of the bottomhole pressure within a period (t0-t1) when bottomhole pressure waves are transmitted to the wellhead standpipe pressure gauge $F_1$, MPa; $\Delta P_{b3}$ is a change in bottomhole pressure within a period (t1-t2) when a wellhead back pressure is transmitted to the bottomhole after the throttle valve is actuated, MPa; t0 is a time when the bottomhole pressure deviates from the design, s; t1 is a time when the measured value of the standpipe pressure gauge $F_1$ deviates from the designed standpipe pressure, s; t2 is a time when the wellhead back pressure is applied to the bottomhole after the opening degree of the automatic throttle valve $J_1$ is adjusted, s;

$$\Delta t_{0-1} = t1 - t0 = \frac{H}{v_{w\_in\_pipe}}$$

is a time length from time t0 to time t1, that is, the time required for the bottomhole pressure waves being transmitted to the wellhead standpipe pressure gauge $F_1$, s; H is a well depth, m; $v_{w\_in\_pipe}$ is a pressure wave propagation velocity in the drill string, m/s;

$$\Delta t_{1-2} = t2 - t1 = \frac{H}{v_{w\_in\_annulus}}$$

is a time length from time t1 to time t2, that is, the time length that pressure waves of the wellhead back pressure are transmitted to the bottomhole after the opening degree of the automatic throttle valve $J_1$ is adjusted, s; $v_{w\_in\_annulus}$ is a pressure wave propagation velocity in the annulus, m/s.

The calculation method of $\Delta P_{b1}$ is $\Delta P_1 = P_{d\_measured} - P_{d\_designed}$;

wherein, $P_{d\_measured}$ is a measured value of the standpipe pressure gauge $F_1$ when the standpipe pressure deviates, MPa; $P_{d\_designed}$ is a designed standpipe pressure value, MPa.

The calculation method of $\Delta P_{b2}$ is as follows: predicting a bottomhole pressure at time t1 after $\Delta t_{0-1}$ by taking a parameter at time t0 as an initial state by using the wellbore transient multiphase fluid mechanics model.

The wellbore transient multiphase fluid mechanics model and an initial calculation condition and a calculation boundary condition are as follows:

$$\begin{cases} \text{gas-phase continuity equation:} & \frac{\partial}{\partial z}(A\rho_g E_g v_g) + \frac{\partial}{\partial t}(A\rho_g E_g) = \Gamma_g \\ \text{liquid-phase continuity equation:} & \frac{\partial}{\partial z}(A\rho_l E_l v_l) + \frac{\partial}{\partial t}(A\rho_l E_l) = 0 \\ \text{motion equation:} & \frac{\partial}{\partial t}(A\rho_l E_l v_l + A\rho_g E_g v_g) + \\ & \frac{\partial}{\partial z}(A\rho_l E_l v_l^2 + A\rho_g E_g v_g^2) + \\ & A\frac{\partial P}{\partial z} + A\rho_m g + A\left(\frac{\partial P}{\partial z}\right)_{fr} = 0 \end{cases}$$

the initial calculation condition:

$$\begin{cases} E_g(0, j) = E_g(t0, j), E_l(0, j) = 1 - E_g(t0, j) \\ v_g(0, j) = v_g(t0, j), v_l(0, j) = v_l(t0, j) \\ P(0, j) = P(t0, j) \end{cases}$$

the calculation boundary condition:

$$\begin{cases} P_b(t) = P_{d\_measured}(t0) + \rho g H - P_{d\_f} \\ q_o(t) = q_{o\_measured}(t0), q_l(t) = q_{l\_measured}(t0) \\ P_c(t) = P_{c\_measured}(t0) \end{cases}$$

wherein, A is a cross-sectional area in the annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in a continuity equation, kg/m/s; $\rho_l$ is a density of the drilling fluid, kg/m$^3$; $E_l$ is a liquid holdup rate, $E_l+E_g=1$, dimensionless; $v_1$ is a flow velocity of the drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where gas invasion occurs, m; t is time, s; $q_l(t)$ is an inlet displacement of the drilling fluid, L/s; $q_{l\_measured}(t0)$ is a wellhead inlet displacement measured at time t0 L/s; $P_b(t)$ is a bottomhole pressure at time t0, MPa; $P_{d\_measured}(t0)$ is a standpipe pressure measured at time t0, MPa; $P_{d\_f}$ is a pressure loss in the drill string, MPa; $q_o(t)$ is an outlet displacement of the wellhead annulus, L/s; $q_{o\_measured}(t0)$ is an outlet displacement of the wellhead annulus measured at time t0, L/s; $P_c(t)$ is a wellhead casing pressure, MPa; $P_{c\_measured}(t0)$ is a wellhead casing pressure measured at time t0, MPa.

A bottomhole pressure $P_b(t1)$ at time t1 is solved by the wellbore transient multiphase fluid mechanics model iteratively by using an implicit difference method;

the calculation formula $\Delta P_{b2}$ is $\Delta P_{b2}=P_b(t1)-P_{d\_measured}$;

the calculation method of $\Delta P_{b3}$ is as follows: predicting a bottomhole pressure at time t2 after $\Delta t_{1-2}$ by taking a parameter at time t1 as an initial state by using the wellbore transient multiphase fluid mechanics model.

The wellbore transient multiphase fluid mechanics model and an initial calculation condition and a calculation boundary are as follows:

$$\begin{cases} \text{gas-phase} \\ \text{continuity equation:} & \frac{\partial}{\partial z}(A\rho_g E_g v_g) + \frac{\partial}{\partial t}(A\rho_g E_g) = \Gamma_g \\ \text{liquid-phase} \\ \text{continuity equation:} & \frac{\partial}{\partial z}(A\rho_l E_l v_l) + \frac{\partial}{\partial t}(A\rho_l E_l) = 0 \\ \text{motion equation:} & \frac{\partial}{\partial t}(A\rho_l E_l v_l + A\rho_g E_g v_g) + \\ & \frac{\partial}{\partial z}(A\rho_l E_l v_l^2 + A\rho_g E_g v_g^2) + \\ & A\frac{\partial P}{\partial z} + A\rho_m g + A\left(\frac{\partial P}{\partial z}\right)_{fr} = 0 \end{cases}$$

the initial calculation condition:

$$\begin{cases} E_g(0, j) = E_g(t1, j), E_l(0, j) = 1 - E_g(t1, j) \\ v_g(0, j) = v_g(t1, j), v_l(0, j) = v_l(t1, j) \\ P(0, j) = P(t1, j) \end{cases}$$

the calculation boundary calculation condition:

$$\begin{cases} P_b(t) = P_{d\_measured}(t1) + \rho g H - P_{d\_f} \\ q_o(t) = q_{o\_measured}(t1), q_l(t) = q_{l\_measured}(t1) \\ P_c(t) = P_{c\_measured}(t1) \end{cases}$$

wherein, A is a cross-sectional area of the annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in a continuity equation, kg/m/s; $\rho_l$ is a density of the drilling fluid, kg/m$^3$; $E_l$ is a liquid holdup rate, $E_l+E_g=1$, dimensionless; $v_1$ is a flow velocity of the drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where gas invasion occurs, m; t is time, s; $q_l(t)$ is a drilling fluid inlet displacement, L/s; $q_{l\_measured}(t1)$ is a wellhead inlet displacement measured at time t1, L/s; $P_b(t)$ is a bottomhole pressure at time t0, MPa; $P_{d\_measured}(t1)$ is a standpipe pressure measured at time t1, MPa; $P_{d\_f}$ is a pressure loss in the drill string, MPa; $q_o(t)$ is an outlet displacement of the wellhead annulus, L/s; $q_{o\_measured}(t1)$ is an outlet displacement of the wellhead annulus measured at time t1, L/s; $P_c(t)$ is a wellhead casing pressure, MPa; $P_{c\_measured}(t1)$ is a wellhead casing pressure measured at time t1, MPa.

A bottomhole pressure $P_b(t2)$ at time t2 is solved by the wellbore transient multiphase fluid mechanics model iteratively by using an implicit difference method;

the calculation formula $\Delta P_{b3}$ of is $\Delta P_{b3}=P_b(t2)-P_b(t1)$.

The above descriptions are only preferred embodiments of the present invention. It should be understood that the present invention is not limited to the forms disclosed herein, and should not be regarded as excluding other embodiments, but can be used in various other combinations, modifications, and environments, and can be modified within the concept scope described herein according to the above teachings or the techniques or knowledge in the related art. Modifications and changes made by those skilled in the art without departing from the spirit and scope of the present invention should all fall within the protection scope of the appended claims of the present invention.

The invention claimed is:

1. An intelligent throttled well-killing method for overflow in high-temperature and high-pressure deep drilling, comprising the following steps:

S1: before well-killing starts, solving a formation pressure and a designed standpipe pressure by closing a blowout preventer; calculating a wellbore fluid distribution by using a wellbore flow parameter analysis and correction module; displaying data of a standpipe pressure of the designed standpipe pressure during well-killing on a designed standpipe pressure curve module in an intelligent throttled well-killing construction operation console; displaying data of a designed casing pressure on a designed casing pressure curve module in the intelligent throttled well-killing construction operation console; displaying data of a designed well-killing displacement on a measured/designed outlet and inlet displacement curve module in the intelligent throttled well-killing construction operation console; inspecting whether a switch position of each gate valve is normal, and the throttle manifold is in a standby condition;

S2: opening a flat gate valve and starting a mud pump; injecting a well-killing fluid in a drilling fluid tank into a wellbore through a drill string; adjusting an automatic control throttle valve to make a measured value of a casing pressure gauge equal to a shut-in casing pressure and keep the measured value of the casing pressure gauge unchanged until a displacement of the well-killing fluid reaches the designed well-killing displacement, and during this period, updating and correcting the wellbore fluid distribution in real time through the wellbore flow parameter analysis and correction module; and S3: keeping the displacement of the well-killing fluid constant, and injecting the well-killing fluid in the drilling fluid tank into the wellbore through the drill string; gradually discharging an overflow above a drill bit from the wellbore through an annulus, and during this period, updating and correcting the wellbore fluid distribution in real time through the wellbore flow parameter analysis and correction module, wherein when a measured value of a standpipe pressure gauge deviates from the designed standpipe pressure, a bottomhole pressure has deviated from a designed bottomhole pressure; predicting and calculating a development trend of the bottomhole pressure by using the wellbore flow parameter analysis and correction module; determining a target pressure adjustment value; sending a target value to be adjusted to an automatic opening degree adjustment module for an automatic control throttle valve; sending a throttle valve adjustment instruction through the automatic opening degree adjustment module for the automatic control throttle valve; and adjusting the automatic control throttle valve to make the measured value of the standpipe pressure coincident with the designed standpipe pressure.

2. The intelligent throttled well-killing method for overflow in high-temperature and high-pressure deep drilling according to claim 1, wherein in step S1, a fluid distribution in a wellbore annulus comprises an overflow height in the wellbore annulus, a gas holdup rate in the wellbore annulus, a liquid holdup rate in the wellbore annulus, a pressure distribution in the wellbore annulus, a gas flow velocity in the wellbore annulus and a liquid flow velocity in the wellbore annulus.

3. The intelligent throttled well-killing method for overflow in high-temperature and high-pressure deep drilling according to claim 1, wherein in step S1, a method for calculating the wellbore fluid distribution through the wellbore flow parameter analysis and correction module is as follows:

S101: after the overflow occurs and before a well is shut in, measuring data in real time through an inlet flowmeter, an outlet flowmeter, and a standpipe pressure gauge to obtain the fluid distribution in the wellbore annulus in combination with a wellbore transient multiphase fluid mechanics model, wherein the wellbore transient multiphase fluid mechanics model and an initial calculation condition and a calculation boundary condition are as follows:

the wellbore transient multiphase fluid mechanics model:

$$\begin{cases} \text{gas-phase} \\ \text{continuity equation:} \end{cases} \frac{\partial}{\partial z}(A\rho_g E_g v_g) + \frac{\partial}{\partial t}(A\rho_g E_g) = \Gamma_g$$

$$\begin{cases} \text{liquid-phase} \\ \text{continuity equation:} \end{cases} \frac{\partial}{\partial z}(A\rho_l E_l v_l) + \frac{\partial}{\partial t}(A\rho_l E_l) = 0$$

$$\text{motion equation:} \quad \frac{\partial}{\partial t}(A\rho_l E_l v_l + A\rho_g E_g v_g) +$$
$$\frac{\partial}{\partial z}(A\rho_l E_l v_l^2 + A\rho_g E_g v_g^2) +$$
$$A\frac{\partial P}{\partial z} + A\rho_m g + A\left(\frac{\partial P}{\partial z}\right)_{fr} = 0$$

the initial calculation condition:

$$\begin{cases} E_g(0, j) = 0, E_l(0, j) = 1 \\ v_g(0, j) = 0, v_l(0, j) = q_l/A \\ P(0, j) = \rho g j + P_f \end{cases}$$

the calculation boundary calculation:

$$\begin{cases} P_b(t) = P_{d\_measured}(t) + \rho g H - P_{d\_f} \\ q_o(t) = q_{o\_measured}(t) \end{cases}$$

wherein, A is a cross-sectional area of the wellbore annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in the gas-phase continuity equation, kg/m/s; $\rho_l$ is a density of a drilling fluid, kg/m$^3$; $E_l$ is a liquid holdup rate, $E_l+E_g=1$, dimensionless; $v_l$ is a flow velocity of the drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where a gas invasion occurs, m; t is time, s; $q_l$ is an inlet displacement of the drilling fluid, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of a wellhead annulus, L/s; $q_{o\_measured}(t)$ is an outlet displacement of the wellhead annulus measured at time t, L/s;

the wellbore transient multiphase fluid mechanics model is solved iteratively using an implicit difference method to obtain the fluid distribution in the wellbore annulus; and S102: during a period from shut-in to a stage before well-killing, measuring data by using the casing pressure gauge in real time; based on a state of the fluid distribution in the wellbore annulus before shut-in, obtaining the fluid distribution in the wellbore annulus by using a shut-in wellbore fluid mechanics model, wherein the shut-in wellbore fluid mechanics model takes into account shut-in after-flow and slippage effects, wherein, the shut-in wellbore fluid mechanics model is as follows:

$$\sum_{i=1}^{n} A_a(t, i)E_g(t, i)h_g(t, i) - \sum_{i=1}^{n} A_a(t-\Delta t, i)E_g(t-\Delta t, i)h_g(t-\Delta t, i) =$$

$$\sum_{x=1}^{X} C_l \frac{P_x(t) - P_x(t-\Delta t)}{2} V_{lx}(t) + V_f(t)$$

wherein, $A_a(t,i)$ is a cross-section area of the wellbore annulus, m$^2$; $E_g(t,i)$ is a unit gas holdup rate, %; $h_g(t,i)$ is a unit length, m; $P_x(t)$ is a pressure at position x in the wellbore; $V_{lx}(t)$ is a volume of the drilling fluid in a wellbore unit, m$^3$; $V_f(t)$ is a filtration loss of the drilling fluid per unit time step, m$^3$; $\Delta t$ is a time step, s; and the shut-in wellbore fluid mechanics model is solved by using a Gauss-Seidel iterative method to obtain the fluid distribution in the wellbore annulus.

4. The intelligent throttled well-killing method for overflow in high-temperature and high-pressure deep drilling according to claim 1, wherein in step S2, a method for adjusting the automatic control throttle valve is as follows: monitoring the measured value of the casing pressure gauge in real time, and comparing the measured value of the casing pressure gauge with a shut-in casing pressure value; when a deviation value occurs between the measured value of the casing pressure gauge and the shut-in casing pressure value, sending the deviation value to an automatic opening degree adjustment module of an automatic throttle valve; sending a control instruction to the automatic control throttle valve through the automatic opening degree adjustment module of the automatic throttle valve to adjust an opening degree of the automatic throttle valve and maintain a wellhead casing pressure equal to the shut-in casing pressure.

5. The intelligent throttled well-killing method for overflow in high-temperature and high-pressure deep drilling according to claim 1, wherein in step S2, a method for determining whether the displacement of the well-killing fluid reaches the designed well-killing displacement is as follows: determining whether the displacement of the well-killing fluid has reached the designed well-killing displacement based on a measured/designed displacement curve of the well-killing fluid in the measured/designed outlet and inlet displacement curve module in the intelligent throttled well-killing construction operation console.

6. The intelligent throttled well-killing method for overflow in high-temperature and high-pressure deep drilling according to claim 1, wherein in step S2, a method for updating and correcting the wellbore fluid distribution in real time comprises: measuring a well-killing fluid outlet displacement by an outlet flowmeter in real time, measuring a well-killing fluid inlet displacement by an inlet flowmeter in real time, measuring a standpipe pressure by a standpipe pressure gauge in real time, and measuring a casing pressure by a casing pressure gauge in real time; and updating and correcting the wellbore fluid distribution obtained in step S1 in real time in combination with a wellbore transient multiphase fluid mechanics model; and the wellbore transient multiphase fluid mechanics model, an initial calculation condition and a calculation boundary condition are as follows:

the wellbore transient multiphase fluid mechanics model:

$$\begin{cases} \text{gas-phase} \\ \text{continuity equation:} & \frac{\partial}{\partial z}(A\rho_g E_g v_g) + \frac{\partial}{\partial t}(A\rho_g E_g) = \Gamma_g \\ \text{liquid-phase} \\ \text{continuity equation:} & \frac{\partial}{\partial z}(A\rho_l E_l v_l) + \frac{\partial}{\partial t}(A\rho_l E_l) = 0 \\ \text{motion equation:} & \frac{\partial}{\partial t}(A\rho_l E_l v_l + A\rho_g E_g v_g) + \\ & \frac{\partial}{\partial z}(A\rho_l E_l v_l^2 + A\rho_g E_g v_g^2) + \\ & A\frac{\partial P}{\partial z} + A\rho_m g + A\left(\frac{\partial P}{\partial z}\right)_{fr} = 0 \end{cases}$$

the initial calculation condition:

$$\begin{cases} E_g(S2\_0, j) = E_g(S1\_end, j), E_l(S2\_0, j) = 1 - E_g(S1\_end, j) \\ v_g(S2\_0, j) = v_g(S1\_end, j), v_l(S2\_0, j) = v_l(S1\_end, j) \\ P(S2\_0, j) = P(S1\_end, j) \end{cases}$$

the calculation boundary condition:

$$\begin{cases} P_b(t) = P_{d\_measured}(t) + \rho g H - P_{d\_f} \\ q_o(t) = q_{o\_measured}(t), q_l(t) = q_{l\_measured}(t) \\ P_c(t) = P_{c\_measured}(t) \end{cases}$$

wherein, A is a cross-sectional area of the wellbore annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in the gas-phase continuity equation, kg/m/s; $\rho_l$ is a density of a drilling fluid, kg/m$^3$; $E_l$ is a liquid holdup rate, $E_l + E_g = 1$, dimensionless; $v_1$ is a flow velocity of the drilling fluid, m/s; P is a pressure, Pa; $\rho_m$ is a density of a mixture, $\rho_m = \rho_l E_l + \rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where a gas invasion occurs, m; t is time, s; S2_0 is a start time of the step S2; S1_end is a n end time of the step S1; $q_l(t)$ is an inlet displacement of the drilling fluid, L/s; $q_{l\_measured}(t)$ is an wellhead inlet displacement measured at time t, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of a wellhead annulus, L/s; $q_{o\_measured}(t)$ is an outlet displacement of the wellhead annulus measured at time t, L/s; $P_c(t)$ is a wellhead casing pressure, MPa; and $P_{c\_measured}(t)$ is a wellhead casing pressure measured at time t, MPa; and the wellbore transient multiphase fluid mechanics model is solved iteratively using an implicit difference method.

7. The intelligent throttled well-killing method for overflow in high-temperature and high-pressure deep drilling according to claim 1, wherein in step S3, a method for updating and correcting the wellbore fluid distribution in real time comprises: measuring a well-killing fluid outlet placement by an inlet flowmeter in real time, measuring a well-killing fluid inlet displacement by an inlet flowmeter in real time, measuring a standpipe pressure by a standpipe pressure gauge in real time, and measuring a casing pressure by a casing pressure gauge in real time; and updating and correcting the wellbore fluid distribution obtained in step S2 in real time in combination with a wellbore transient multiphase fluid mechanics model; and the wellbore transient multiphase fluid mechanics model, the initial calculation condition and the calculation boundary condition are as follows:

the wellbore transient multiphase fluid mechanics model:

$$\begin{cases} \text{gas-phase} \\ \text{continuity equation:} \end{cases} \frac{\partial}{\partial z}(A\rho_g E_g v_g) + \frac{\partial}{\partial t}(A\rho_g E_g) = \Gamma_g$$

$$\begin{cases} \text{liquid-phase} \\ \text{continuity equation:} \end{cases} \frac{\partial}{\partial z}(A\rho_l E_l v_l) + \frac{\partial}{\partial t}(A\rho_l E_l) = 0$$

$$\text{motion equation:} \quad \frac{\partial}{\partial t}(A\rho_l E_l v_l + A\rho_g E_g v_g) +$$

$$\frac{\partial}{\partial z}(A\rho_l E_l v_l^2 + A\rho_g E_g v_g^2) +$$

$$A\frac{\partial P}{\partial z} + A\rho_m g + A\left(\frac{\partial P}{\partial z}\right)_{fr} = 0$$

the initial calculation condition:

$$\begin{cases} E_g(S3\_0, j) = E_g(S2\_end, j), E_l(S3\_0, j) = 1 - E_g(S2\_end, j) \\ v_g(S3\_0, j) = v_g(S2\_end, j), v_l(S3\_0, j) = v_l(S2\_end, j) \\ P(S3\_0, j) = P(S2\_end, j) \end{cases}$$

the calculation boundary condition:

$$\begin{cases} P_b(t) = P_{d\_measured}(t) + \rho g H - P_{d\_f} \\ q_o(t) = q_{o\_measured}(t), q_l(t) = q_{l\_measured}(t) \\ P_c(t) = P_{c\_measured}(t) \end{cases}$$

wherein, A is a cross-sectional area of the wellbore annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in the gas-phase continuity equation, kg/m/s; $\rho_l$ is a density of drilling fluid, kg/m$^3$; $E_l$ is a liquid holdup rate, $E_l+E_g=1$, dimensionless; $v_l$ is a flow velocity of the drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is friction pressure drop, MPa/m; j is a position, m; $P_f$ is an annulus pressure loss, MPa; H is a well depth where a gas invasion occurs, m; t is time, s; S3_0 is a start time in step S3; S2_end is a start time of the step S2; $q_i(t)$ is an inlet displacement of the drilling fluid, L/s; $q_{l\_measured}(t)$ is a wellhead inlet displacement measured at time t, L/s; $P_b(t)$ is a bottomhole pressure at time t, MPa; $P_{d\_measured}(t)$ is a standpipe pressure measured at time t, MPa; $P_{d\_f}$ is a pressure loss in a drill string, MPa; $q_o(t)$ is an outlet displacement of a wellhead annulus, L/s; $q_{o\_measured}(t)$ is an outlet displacement of the wellhead annulus measured at time t, L/s; $P_c(t)$ is a wellhead casing pressure measured at time t, MPa; $P_{c\_measured}(t)$ is a wellhead casing pressure measured at time t, MPa; and the wellbore transient multiphase fluid mechanics model is solved iteratively using an implicit difference method.

8. The intelligent throttled well-killing method for overflow in high-temperature and high-pressure deep drilling according to claim 1, wherein in step S3, when the measured value of the standpipe pressure gauge deviates from the designed standpipe pressure, a development trend of the bottomhole pressure is predicated and calculated through the wellbore flow parameter analysis and correction module, and a method for determining the target pressure adjustment value is as follows:

the target pressure adjustment value is: $\Delta P_b = \Delta P_{b1} + \Delta P_{b2} + \Delta P_{b3}$ wherein, $\Delta P_b$ is the target pressure adjustment value, MPa; $\Delta P_{b1}$ is a deviation value at time (t1) when the measured value of the standpipe pressure gauge is monitored to deviate the designed standpipe pressure, MPa; $\Delta P_{b2}$ is a change value of the bottomhole pressure within a period (t0-t1) when bottomhole pressure waves are transmitted to the wellhead standpipe pressure gauge, MPa; $\Delta P_{b3}$ is a change in the bottomhole pressure within a period (t1-2) when a wellhead back pressure is transmitted to a bottomhole after a throttle valve is actuated, MPa; t0 is a time when the bottomhole pressure deviates from the designed bottomhole pressure, s; t1 is a time when the measured value of the standpipe pressure gauge deviates from the designed standpipe pressure, s; t2 is a time when the wellhead back pressure is applied to the bottomhole after the opening degree of the automatic throttle valve is adjusted, s;

$$\Delta t_{0-1} = t1 - t0 = \frac{H}{v_{w\_in\_pipe}}$$

is a first time length from time t0 to time t1, and in the first time length, the bottomhole pressure waves are transmitted to the wellhead standpipe pressure gauge, s; H is a well depth, m; $v_{w\_in\_pipe}$ is a pressure wave propagation velocity in the drill string, m/s;

$$\Delta t_{1-2} = t2 - t1 = \frac{H}{v_{w\_in\_annulus}}$$

is a second time length from time t1 to time t2, and in the second time length, the pressure waves of the wellhead back pressure are transmitted to the bottomhole after the opening degree of the automatic throttle valve is adjusted, s; $v_{w\_in\_annulus}$ is a pressure wave propagation velocity in the wellbore annulus, m/s;

a calculation method of $\Delta F$ is $\Delta P_{b1} = P_{d\_measured} - P_{d\_designed}$;

wherein, $P_{d\_measured}$ is the measured value of the standpipe pressure gauge when the standpipe pressure deviates from the designed standpipe pressure, MPa; $P_{d\_designed}$ is the designed standpipe pressure value, MPa;

a calculation method of $\Delta P_{b2}$ is as follows: predicting a bottomhole pressure at time t1 after $\Delta t_{0-1}$ by taking a parameter at time t0 as an initial state through a wellbore transient multiphase fluid mechanics model;

the wellbore transient multiphase fluid mechanics model and a first initial calculation condition and a first calculation boundary condition are as follows:

the wellbore transient multiphase fluid mechanics model:

$$\begin{cases} \text{gas-phase} \\ \text{continuity equation:} \end{cases} \frac{\partial}{\partial z}(A\rho_g E_g v_g) + \frac{\partial}{\partial t}(A\rho_g E_g) = \Gamma_g$$

$$\begin{cases} \text{liquid-phase} \\ \text{continuity equation:} \end{cases} \frac{\partial}{\partial z}(A\rho_l E_l v_l) + \frac{\partial}{\partial t}(A\rho_l E_l) = 0$$

$$\text{motion equation:} \quad \frac{\partial}{\partial t}(A\rho_l E_l v_l + A\rho_g E_g v_g) +$$
$$\frac{\partial}{\partial z}(A\rho_l E_l v_l^2 + A\rho_g E_g v_g^2) +$$
$$A\frac{\partial P}{\partial z} + A\rho_m g + A\left(\frac{\partial P}{\partial z}\right)_{fr} = 0$$

the first initial calculation condition:

$$\begin{cases} E_g(0, j) = E_g(t0, j), E_l(0, j) = 1 - E_g(t0, j) \\ v_g(0, j) = v_g(t0, j), v_l(0, j) = v_l(t0, j) \\ P(0, j) = P(t0, j) \end{cases}$$

the first calculation boundary condition:

$$\begin{cases} P_b(t) = P_{d\_measured}(t) + \rho g H - P_{d\_f} \\ q_o(t) = q_{o\_measured}(t), q_l(t) = q_{l\_measured}(t) \\ P_c(t) = P_{c\_measured}(t) \end{cases}$$

wherein, A is a cross-sectional area in the wellbore annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in the gas-phase continuity equation, kg/m/s; $\rho_l$ is a density of the drilling fluid, kg/m$^3$; $E_l$ is a liquid holdup rate, $E_l+E_g=1$, dimensionless; $v_l$ is a flow velocity of the drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where a gas invasion occurs, m; t is time, s; $q_l(t)$ is an inlet displacement of the drilling fluid, L/s; $q_{l\_measured}(t0)$ is a wellhead inlet displacement measured at time t0 L/s; $P_b(t)$ is a bottomhole pressure at time t0, MPa; $P_{d\_measured}(t0)$ is a standpipe pressure measured at time t0, MPa; $P_{d\_f}$ is a pressure loss in the drill string, MPa; $q_o(t)$ is an outlet displacement of a wellhead annulus, L/s; $q_{o\_measured}(t0)$ is an outlet displacement of the wellhead annulus measured at time t0, L/s; $P_c(t)$ is a wellhead casing pressure, MPa; $P_{c\_measured}(t0)$ is a wellhead casing pressure measured at time t0, MPa; and a bottomhole pressure $P_b(t1)$ at time t1 is solved by the first wellbore transient multiphase fluid mechanics model iteratively through an implicit difference method;

a calculation formula $\Delta P_{b2}$ is $\Delta P_{b2}=P_b(t1)-P_{d\_measured}$;

a calculation method of $\Delta P_{b3}$ is as follows: predicting a bottomhole pressure at time t2 after $\Delta t_{1-2}$ by taking a parameter at time t1 as an initial state through the wellbore transient multiphase fluid mechanics model;

the wellbore transient multiphase fluid mechanics model and a second initial calculation condition and a second calculation boundary are as follows:

the wellbore transient multiphase fluid mechanics model:

$$\begin{cases} \text{gas-phase} \\ \text{continuity equation:} \end{cases} \frac{\partial}{\partial z}(A\rho_g E_g v_g) + \frac{\partial}{\partial t}(A\rho_g E_g) = \Gamma_g$$

$$\begin{cases} \text{liquid-phase} \\ \text{continuity equation:} \end{cases} \frac{\partial}{\partial z}(A\rho_l E_l v_l) + \frac{\partial}{\partial t}(A\rho_l E_l) = 0$$

$$\text{motion equation:} \quad \frac{\partial}{\partial t}(A\rho_l E_l v_l + A\rho_g E_g v_g) +$$
$$\frac{\partial}{\partial z}(A\rho_l E_l v_l^2 + A\rho_g E_g v_g^2) +$$
$$A\frac{\partial P}{\partial z} + A\rho_m g + A\left(\frac{\partial P}{\partial z}\right)_{fr} = 0$$

the second initial calculation condition:

$$\begin{cases} E_g(0, j) = E_g(t1, j), E_l(0, j) = 1 - E_g(t1, j) \\ v_g(0, j) = v_g(t1, j), v_l(0, j) = v_l(t1, j) \\ P(0, j) = P(t1, j) \end{cases}$$

the second calculation boundary calculation condition:

$$\begin{cases} P_b(t) = P_{d\_measured}(t1) + \rho g H - P_{d\_f} \\ q_o(t) = q_{o\_measured}(t1), q_l(t) = q_{l\_measured}(t1) \\ P_c(t) = P_{c\_measured}(t1) \end{cases}$$

wherein, A is a cross-sectional area of the wellbore annulus, m$^2$; $\rho_g$ is a gas density, kg/m$^3$; $E_g$ is a gas holdup rate, dimensionless; $v_g$ is a gas flow rate, m/s; $\Gamma_g$ is a gas source term in the gas-phase continuity equation, kg/m/s; $\rho_l$ is a density of the drilling fluid, kg/m$^3$; $E_l$ is a liquid holdup rate, $E_l+E_g=1$, dimensionless; $v_l$ is a flow velocity of the drilling fluid, m/s; P is a pressure, Pa; $\rho_m$ is a density of a mixture, $\rho_m=\rho_l E_l+\rho_g E_g$, kg/m$^3$;

$$\left(\frac{\partial P}{\partial z}\right)_{fr}$$

is a friction pressure drop, MPa/m; j is a position, m; $P_f$ is an annulus pressure loss, MPa; H is a well depth where the gas invasion occurs, m; t is time, s; $q_l(t)$ is a drilling fluid inlet displacement, L/s; $q_{l\_measured}(t1)$ is a wellhead inlet displacement measured at time t1, L/s; $P_b(t)$ is a bottomhole pressure at time t0, MPa; $P_{d\_measured}(t1)$ is a standpipe pressure measured at time t1, MPa; $P_{d\_f}$ is a pressure loss in the drill string, MPa; $q_o(t)$ is an outlet displacement of the wellhead annulus, L/s; $q_{o\_measured}(n)$ is an outlet displacement of the wellhead annulus measured at time t1, L/s; $P_c(t)$ is a wellhead casing pressure, MPa; $P_{c\_measured}(t1)$ is a wellhead casing pressure measured at time t1, MPa; and a bottomhole pressure $P_b(t2)$ at time t2 is solved by the wellbore transient multiphase fluid mechanics model iteratively through the implicit difference method;

a calculation formula $\Delta P_{b3}$ of is $\Delta P_{b3}=P_b(t2)-P_b(t1)$.

9. An intelligent throttled well-killing method for overflow in high-temperature and high-pressure deep drilling, comprising an inlet flowmeter, an outlet flowmeter, a standpipe pressure gauge, a casing pressure gauge, an automatic control throttle valve, a manual control throttle valve, flat gate valves, an intelligent throttled well-killing construction operation console and a data acquisition and control line, wherein the inlet flowmeter is installed at a well-killing fluid inlet and the inlet flowmeter is configured to measure an inlet flow in real time;

the standpipe pressure gauge is installed at the well-killing fluid inlet and the standpipe pressure gauge is configured to measure a standpipe pressure in real time;

the outlet flowmeter is installed at a well-killing fluid outlet and the outlet flowmeter is configured to measure an outlet flow in real time;

the casing pressure gauge is installed at a throttle manifold and the casing pressure gauge is configured to measure a casing pressure in real time;

the automatic control throttle valve is installed at the throttle manifold and the automatic control throttle valve is configured to adjust an opening degree of the automatic control throttle valve according to a first plurality of instructions, and the automatic control throttle valve has a working pressure of above 70 MPa;

the manual control throttle valve is installed at the throttle manifold and the manual control throttle valve is configured to manually adjust the opening degree of the automatic control throttle valve according to a second plurality of instructions;

the flat gate valves are installed on the throttle manifold, a blowout prevention pipeline and a relief pipeline, and the flat gate valves are opened and closed according to requirements to control a drilling fluid to flow;

the data acquisition and control line connects the inlet flowmeter, the outlet flowmeter, the standpipe pressure gauge, the casing pressure gauge, the automatic control throttle and the intelligent throttled well-killing construction operation console, and the data acquisition and control line is configured to transmit the first plurality of instructions for measuring data in real time and controlling the opening degree of the automatic control throttle valve;

the intelligent throttled well-killing construction operation console comprises a measurement parameter display module, a wellbore flow parameter analysis and correction module, an automatic opening degree adjustment module of the automatic control throttle valve, a measured casing pressure curve module, a measured standpipe pressure curve module, a designed standpipe pressure curve module, a designed casing pressure curve module, and a measured/designed inlet displacement curve module;

the measurement parameter display module is configured to display inlet flowmeter readings, standpipe pressure gauge readings, outlet flowmeter readings, casing pressure gauge readings, opening degree readings of the automatic control throttle valve, and opening degree adjustment instruction parameters of the automatic control throttle valve, wherein, the inlet flowmeter readings, the standpipe pressure gauge readings, the outlet flowmeter readings, the casing pressure gauge readings, the opening degree readings of the automatic control throttle valve, and the opening degree adjustment instruction parameters of the automatic control throttle valve are currently collected in real time;

the wellbore flow parameter analysis and correction module is configured to establish a wellbore flow parameter analysis and correction model based on a multiphase flow theory in combination with data measured by the inlet flowmeter, the standpipe pressure gauge, the outlet flowmeter and the casing pressure gauge, and calculate an overflow height in a wellbore annulus, a gas holdup rate in the wellbore annulus, a liquid holdup rate in the wellbore annulus, a pressure distribution in the wellbore annulus, a gas flow velocity in the wellbore annulus, a liquid flow velocity in the wellbore annulus, and other parameters;

the automatic opening degree adjustment module of the automatic control throttle valve is configured to send the first plurality of instructions to the automatic control throttle valve by taking a prediction result of the wellbore flow parameter analysis and correction module as an adjustment basis to automatically control the opening degree of the automatic control throttle valve and control a bottomhole pressure within a design range;

the measured/designed inlet displacement curve module is configured to draw data of an outlet displacement measured/designed by the outlet inlet flowmeter and data of an inlet displacement measured/designed by the inlet flowmeter into a first visual graph, wherein, the data of the outlet displacement and the data of the inlet displacement are distributed over time;

the measured casing pressure curve module is configured to draw data of the casing pressure measured by the casing pressure gauge into a second visual graph, wherein the data of the casing pressure are distributed over time;

the measured standpipe pressure curve module is configured to draw data of the standpipe pressure measured by the standpipe pressure gauge into a third visual graph, wherein, the data of the standpipe pressure are distributed over time;

the designed standpipe pressure curve module is configured to draw data of a designed standpipe pressure into a fourth visual graph, wherein the data of the designed standpipe pressure are distributed over time; and the designed casing pressure curve module is configured to draw data of a designed casing pressure into a visual graph, wherein the data of the designed casing pressure are distributed over time.

* * * * *